US006836778B2

(12) United States Patent  (10) Patent No.: US 6,836,778 B2
Manikutty et al.  (45) Date of Patent: Dec. 28, 2004

(54) TECHNIQUES FOR CHANGING XML CONTENT IN A RELATIONAL DATABASE

(75) Inventors: Anand Manikutty, Foster City, CA (US); Muralidhar Krishnaprasad, Fremont, CA (US); Ravi Murthy, Fremont, CA (US); Visar Nimani, Redwood City, CA (US); James Warner, Sunnyvale, CA (US); Eric Sedlar, San Francisco, CA (US); Neema Jalali, Belmont, CA (US); Bhushan Khaladkar, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/428,445

(22) Filed: May 1, 2003

(65) Prior Publication Data

US 2004/0220912 A1 Nov. 4, 2004

(51) Int. Cl.[7] .............................................. G06F 17/30
(52) U.S. Cl. ....................................... 707/102; 707/513
(58) Field of Search ............................... 707/102, 1, 3, 707/100, 513; 709/315

(56) References Cited

U.S. PATENT DOCUMENTS

| 6,604,100 B1 | * | 8/2003 | Fernandez et al. ............. 707/3 |
| 6,636,845 B2 | * | 10/2003 | Chau et al. ..................... 707/1 |
| 2002/0184401 A1 | * | 12/2002 | Kadel et al. ................. 709/315 |
| 2003/0065659 A1 | | 4/2003 | Agarwal et al. |
| 2003/0140308 A1 | | 7/2003 | Murthy et al. |
| 2004/0064466 A1 | * | 4/2004 | Manikutty et al. .......... 707/100 |
| 2004/0088415 A1 | | 5/2004 | Chandrasekar et al. |

OTHER PUBLICATIONS

Braga, D.; Campi, A.; Braga, D.; Campi, A.; A graphical environment to query XML data with XQuery; Dec. 10–12, 2003; Web Information Systems Engineering, 2003. WISE 2003. Proceedings of the Fourth International Conference on, pp.: 31–40.*

(List continued on next page.)

*Primary Examiner*—Diane D. Mizrahi
(74) *Attorney, Agent, or Firm*—Brian D. Hickman; Hickman Palermo Truong & Becker LLP

(57) ABSTRACT

Techniques are provided for changing data for an XML construct in an SQL/XML compliant database management system (DBMS). The DBMS allows instances of XML type to represent XML constructs, such as XML documents, XML elements, XML attributes, and fragments of XML documents. An SQL statement is received that includes an XML operator that operates on a particular component in an instance of XML type. During execution of the SQL statement, the XML operator is evaluated by modifying content for the component without modifying the entire instance. For example, an XML delete operator deletes the particular component from the instance. Other XML operators include an insert operator, an insert-before operator, an append-child operator, and an update operator. During execution, these operators may be rewritten to operate on existing SQL constructs, or evaluated by updating only some of the existing SQL constructs, or both.

40 Claims, 10 Drawing Sheets

OTHER PUBLICATIONS

Josephine Cheng, et al., "IBM DB2 XML Extender, An end–to–end solution for storing and retrieving XML documents," IEEE, ICDE '00 Conference, San Diego, Feb. 2000, 128 pages.

Jim Melton, "ISO–ANSI Working Draft, XML–Related Specifications (SQL/XML)," WG3: DRS–020, H2-2—2-365, Aug. 2002, 154 pages.

Oracle Corporation, "Oracle9i XML Database Developer's Guide—Oracle XML DB," Release 2(9.2), Mar. 2002, Part No. A96620–1, pp. 4–31—4-35, 5–21—5–24 and 5–70—5–71.

W3C, "XML Schema Part 1: Structures," W3C Recommendation, May 2, 2001, http://www.w3.org/TR/2001/REC-xmlschema-1-20010502/, pp. 1–203 (text provided on CD–ROM).

W3C, "XML Schema Part 2: Datatypes," W3C Recommendation, May 2, 2001, http://www.w3.org/TR/2001/REC-xmlschema-2-20010502/, pp. 1–146 (text provided on CD–ROM).

* cited by examiner

110 XML DOCUMENT INSTANCE: PO (PURCHASE ORDER)

- 108 XML ELEMENT: purchaseOrder
  - 109 XML ATTRIBUTE: orderDate
  - 112a XML ELEMENT: shipTo
    - 113a XML ATTRIBUTE: country
    - 114a XML ELEMENT: name
    - 114b XML ELEMENT: street
  - 112b XML ELEMENT: itemList

••• 115

102 XML SCHEMA FOR PO DOCUMENTS

130 XML DATABASE SERVER

- 132 DATABASE MEMORY
  - 134 TREE MODEL OF XML DOCUMENT
- 140 DATABASE STORAGE SPACE
  - 142 MAPPING
  - 144 PO TABLE WITH COLUMNS: ORDERDATE, COUNTRY, NAME, STREET, ITEMLIST
  - 148 COLLECTIONS OF ITEMS

FIG. 2B

280 IN-MEMORY TREE MODEL OF XML DOCUMENT

282a NODE DATA STRUCTURE

284a SERIALIZED REPRESENTATION OF NODE CONTENTS

286a POINTERS TO CHILD NODES

288a BIT VECTOR INDICATING CHANGED CHILDREN

282b NODE DATA STRUCTURE

284b SERIALIZED REPRESENTATION OF NODE CONTENTS

286b POINTERS TO CHILD NODES

288b BIT VECTOR INDICATING CHANGED CHILDREN

••• 290

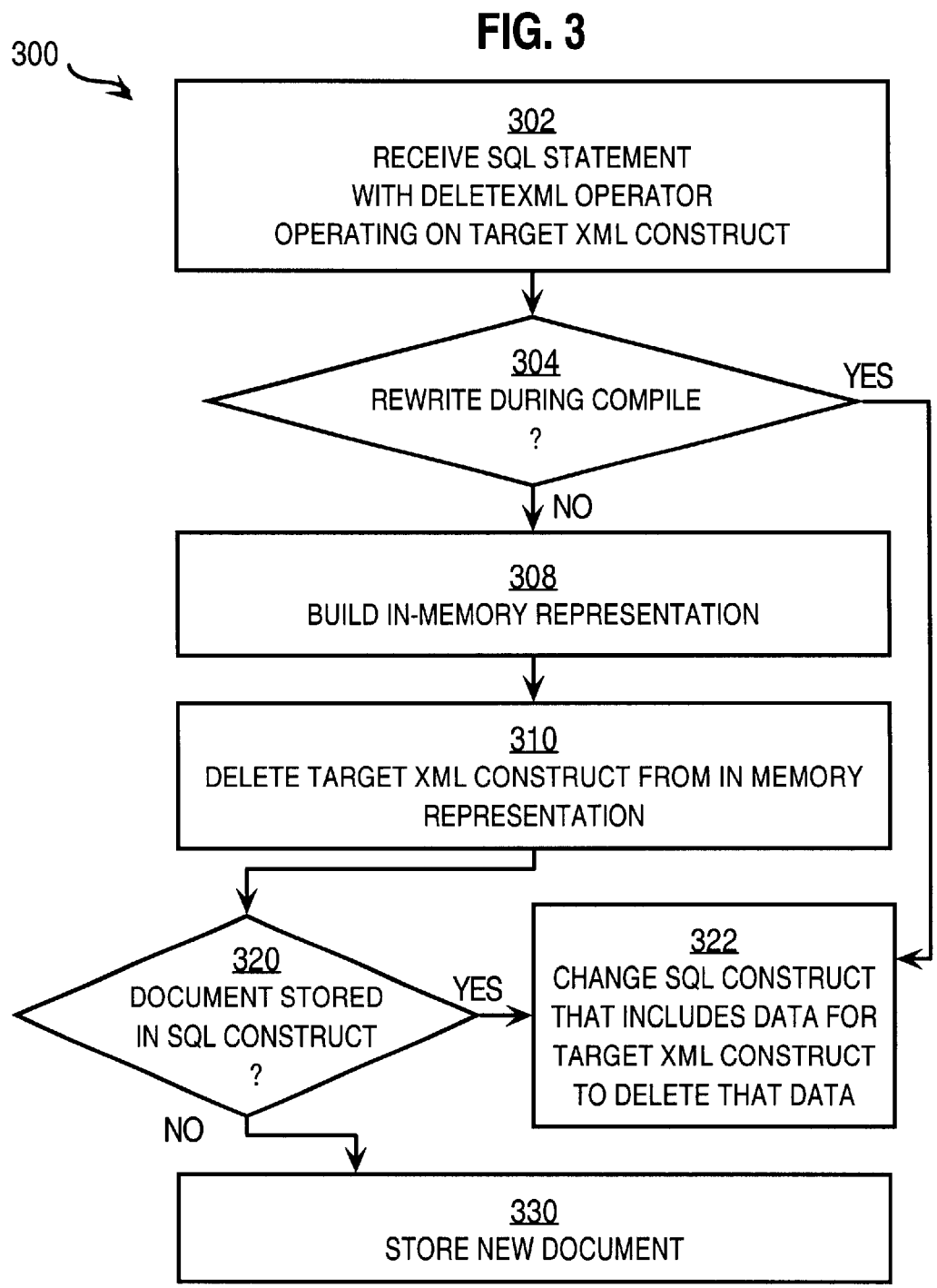

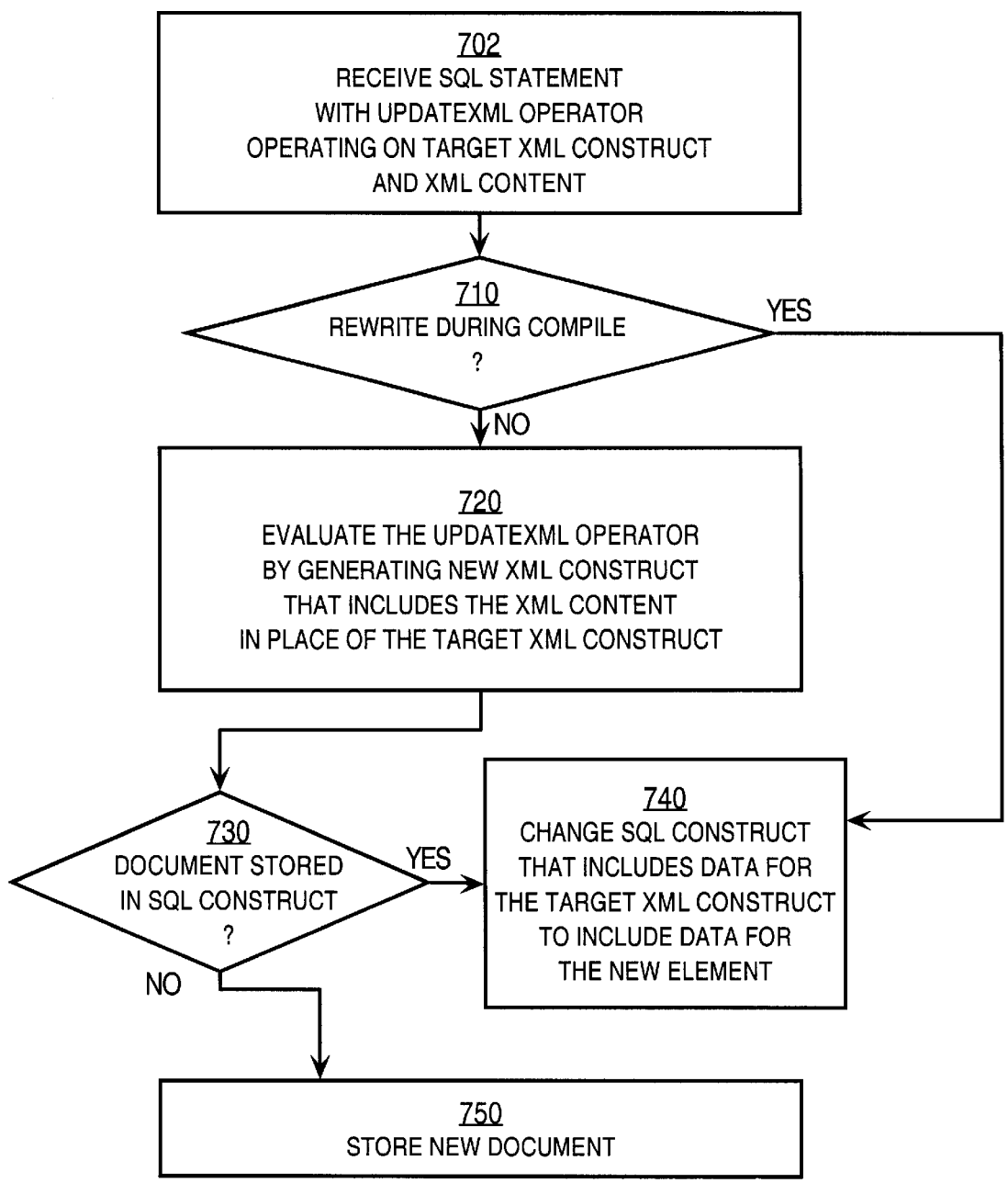

TECHNIQUES FOR CHANGING XML CONTENT IN A RELATIONAL DATABASE

CROSS REFERENCE TO RELATED APPLICATION

This application is related to pending Appln. Ser. No. 10/259,278, filed Sep. 27, 2002, (hereinafter referenced as Murthy et al.) the entire contents of which are hereby incorporated by reference as if fully set forth herein.

FIELD OF THE INVENTION

The present invention relates to techniques for using extensible Markup Language (XML) data in a relational database system.

BACKGROUND OF THE INVENTION

The World Wide Web (WWW) involves a network of servers on the Internet, each of which is associated with one or more Hypertext Markup Language (HTML) pages. The HTML pages are transferred between clients that make requests of servers and the servers using the Hypertext Transfer Protocol (HTTP). Resources available from servers on the Internet are located using a Universal Resource Locator (URL). The standards and protocols of the WWW are promulgated by the World Wide Web Consortium (W3C) through its servers at www.w3c.org, and are used on many private networks in addition to their use on the Internet.

The HTML standard is one application of a more general markup language, standard called the Standard Generalized Markup Language (SGML). Recently, a subset of SGML that is more powerful and flexible than HTML has been defined and has gained popularity for transferring information over the Internet and other networks. The new standard, developed and promoted by W3C, is called the extensible Markup Language (XML). XML provides a common syntax for expressing structure in data. Structured data refers to data that is tagged for its content, meaning, or use. XML provides an expansion of the tagging that is done in HTML, which focuses on format or presentation. XML tags identify XML elements and attributes of XML elements. XML elements can be nested to form hierarchies of elements. As used hereinafter, the terms "element" and "attribute" retain their general meaning and are not limited to XML elements and XML attributes, unless otherwise clear from the context.

A set of syntax rules for XML elements shared by multiple XML documents is defined by an XML schema, itself an XML document. For example, the syntax rules indicate what elements can be used in a document, in what order they should appear, which elements can appear inside other elements, which elements have attributes, what those attributes are, and any restrictions on the type of data or number of occurrences of an element. XML allows documents to contain elements from several distinct XML schema by the use of namespaces. In particular, elements from other, independently created XML schema can be interleaved in one XML document.

Given the elements defined and used by XML, a document object model (DOM) is a tree structure formed to define how the information in a particular XML document is arranged. The DOM is navigated using an XPath expression that indicates a particular node or content in the hierarchy of elements and attributes in an XML document. XPath is a standard promulgated by W3C.

Relational databases predate, and developed independently of, the World Wide Web. Relational databases store data in various types of data containers that correspond to logical relationships within the data. As a consequence, relational databases support powerful search and update capabilities. Relational databases typically store data in tables of rows and columns where the values in all the columns of one row are related. For example, the values in one row of an employee table describe attributes of the same employee, such as her name, social security number, address, salary, telephone number and other information. Each attribute is stored in a different column. Some attributes, called collections, can have multiple entries. For example, the employee may be allowed to have multiple telephone numbers. Special structures are defined in some relational databases to store collections.

A relational database management system (DBMS) is a system that stores and retrieves data in a relational database. The relational DBMS processes requests to perform database functions such as creating and deleting tables, adding and deleting data in tables, and retrieving data from the tables in the database. A well-known standard language for expressing the database requests is the Structured Query Language (SQL).

Object-relational databases extend the power of relational databases. Object-relational databases allow the value in a column to be an object, which may include multiple other attributes. For example, the value in the address column may be an address object that itself has multiple attributes, such as a street address, a city, a state, a country, and a zip code or equivalent. An object type (also called an abstract data type ADT) defines the attributes of an object in an object relational database. SQL has been extended to allow the definition and use of objects and object types in object-relational databases. As used hereinafter, the term "object-relational database" refers to a subset of relational databases that support object-relational constructs; and an object-relational construct is one example of a relational construct. The term "SQL construct" is used hereinafter to refer to relational constructs, such as tables, columns, and rows, and object-relational constructs such as ADT columns and tables and collections.

Because of the popularity of XML as a data exchange format that supports hierarchical relationships among XML elements, and because of the power of relational DBMSs to update and retrieve data, there is a demand for generating XML data output from relational databases and storing XML data into relational databases. In one approach, a database administrator can commission programming efforts to generate code in a procedural language that maps data in particular XML constructs to data in particular relational database constructs and back. Such programming efforts can be expensive.

In another approach, declarative statements, similar to SQL statements, can be employed to simply express the relationship between XKNL constructs and SQL constructs. General routines that convert the data according to declared relationships are written one time by a DBMS vendor and supplied to a database administrator. This saves the database administrator from developing procedural language programs to convert the data. To support this demand, an industry standard SQL to operate on XML documents has been developed. This standard is called SQL/XML and documents relating to SQL/XML are available at the time of this writing at www.sqlx.org. SQL/XML provides declarative statements that can be used to simply express some conversions between hierarchical XML constructs and SQL constructs. For example XMLAgg is a SQL/XML function that generates one XML construct from a set of XML elements generated from selected rows of a relational table. For convenience, hereinafter data that is used for an XML document or fragment thereof is called "XML data," even if it is stored in SQL constructs.

While SQL/XML statements provide powerful tools for many circumstances that arise in converting between XML constructs and SQL constructs, they do not simply accommodate all circumstances that arise. For example, conventional SQL/XML statements do not support modifications to an XML document stored in the SQL DBMS. An XML document is ingested whole or is output whole by the SQL DBMS. A user of the DBMS can make modifications to the contents of the SQL constructs only if the user knows the SQL constructs in sufficient detail. However, a user who knows more readily the XML constructs (e.g., the XML document, XML elements, XML attributes, and fragments of the XML document), cannot use declarative statements that refer to those constructs to modify the document in the DBMS using conventional SQL/XML commands. Such a user might generate the whole XML document from the database, update the document with an XML editor that works on the whole XML document, and then store the revised whole XML document back into the database managed by the SQL compliant DBMS, utilizing DBMS capability to generate needed SQL constructs for the revised XML document.

Based on the foregoing, there is a clear need for SQL compliant declarative statements that allow a user to express changes to the content of an XML construct managed in an SQL compliant DBMS in terms of the XML constructs.

One approach an SQL compliant DBMS can follow is to allow a user to declaratively specify a change to an XML construct in an XML document, and then to have the DBMS temporarily and internally generate the whole XML document from the database, update the document with an XML editor that works on the whole XML document, and then store the revised whole XML document back into the database, generating SQL constructs as needed to hold the new XML constructs. This approach is useful, for example, when the whole document is stored as a single large object (LOB), which is one SQL construct. However, if different XML constructs are stored in different SQL constructs, this approach involves generating XML data from multiple SQL constructs, editing the XML document, and then forming or filling again every SQL construct used to store XML data for the revised XML document. If the contents of some SQL constructs have not changed, computational resources consumed, in outputting data to the temporary XML document from such unchanged constructs and then storing the same data back into the same SQL construct, are wasted.

Based on the foregoing, there is a clear need for evaluating declarative statements that specify changes to content of an XML document without modifying SQL constructs that are not affected by the changes.

The approaches described in this section could be pursued, but are not necessarily approaches that have been previously conceived or pursued. Therefore, unless otherwise indicated herein, the approaches described in this section are not to be considered prior art to that claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates an XML document, an XML schema, and an DBMS server that uses object-relational constructs to store the XML constructs, according to an embodiment;

FIG. 2B is a block diagram that illustrates in-memory data structures for nodes on a tree hierarchy that represents an XML construct, according to an embodiment;

FIG. 3 is a flow diagram that illustrates an overview of a method for deleting XML data from an XML instance managed by the DBMS, according to an embodiment;

Figure 6:
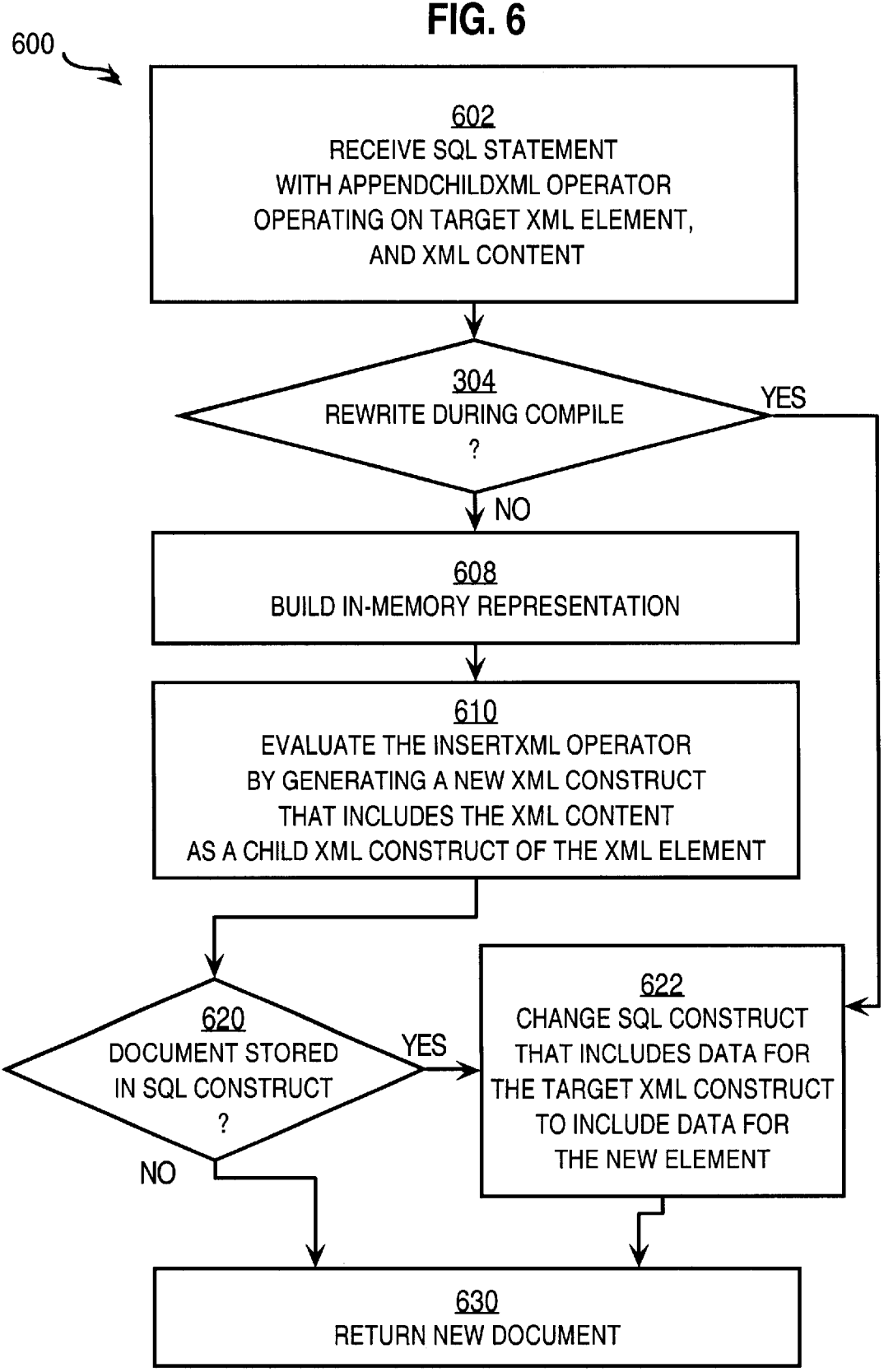
Figure 7B:
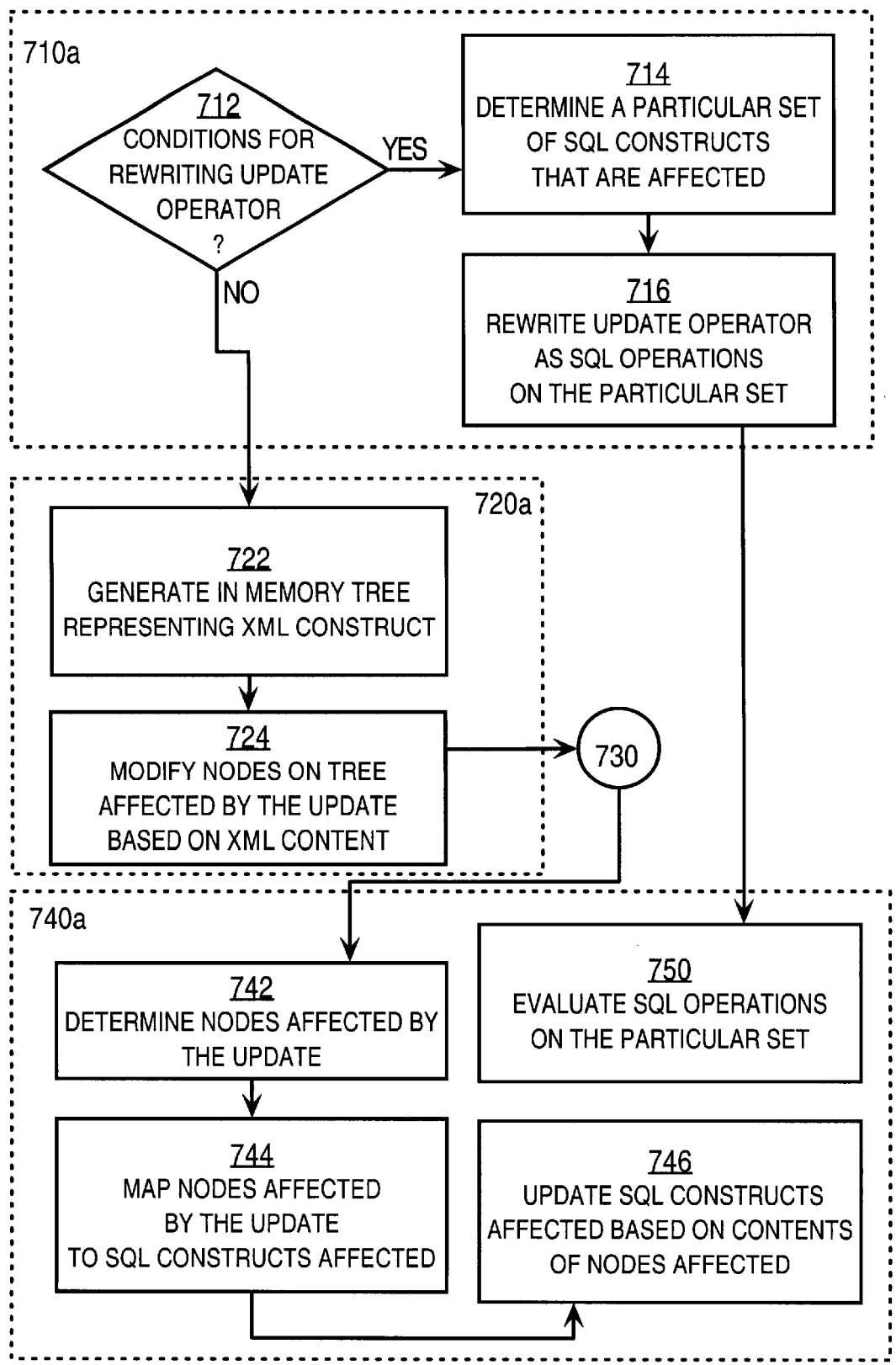
Figure 8:
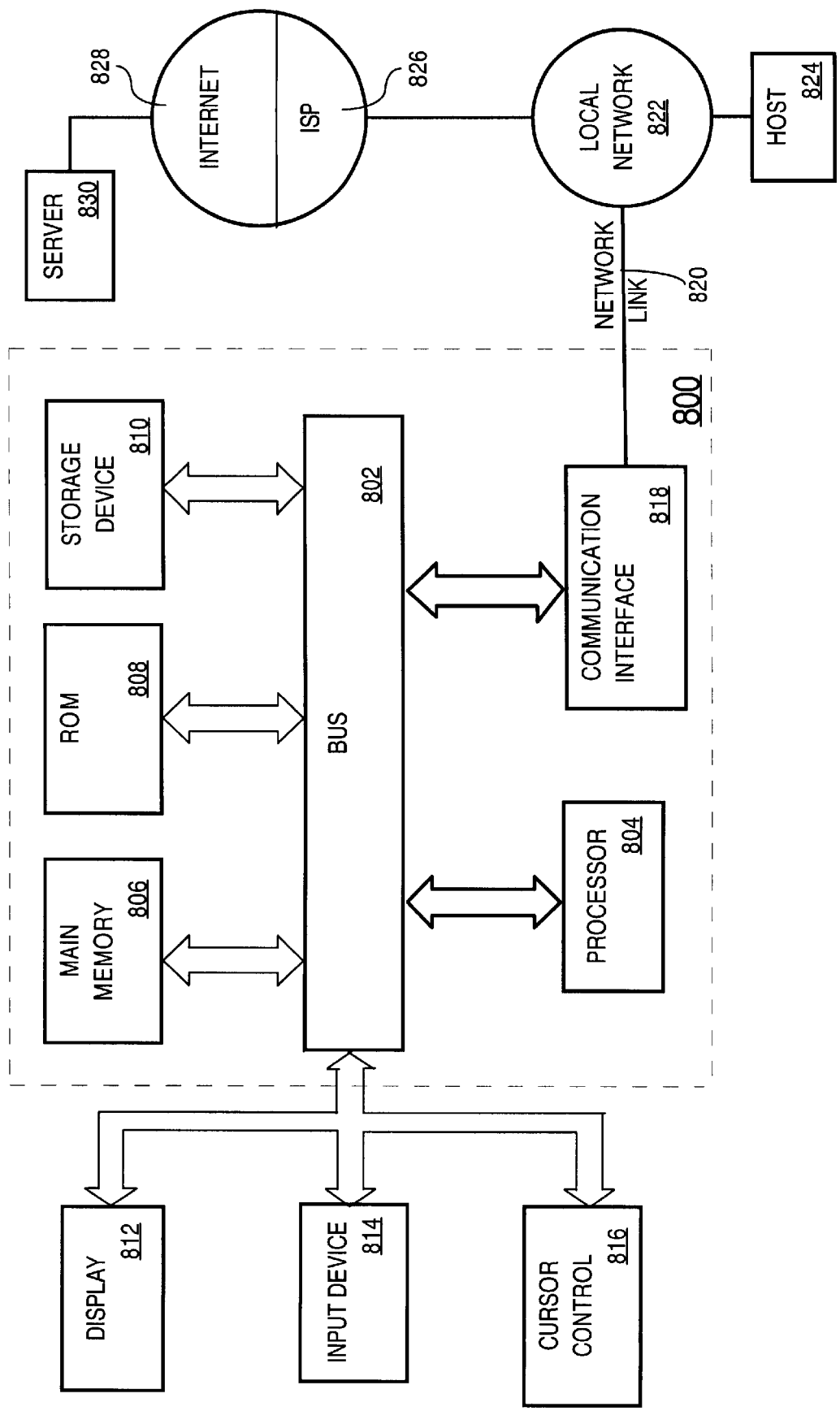

FIG; 5 is a flow diagram that illustrates an overview of a method for inserting XML data before a particular XML construct in an XML instance managed by the DBMS, according to an embodiment;

FIG. 6 is a flow diagram that illustrates an overview of a method for inserting XML data as a child node of a node in an XML instance managed by the DBMS, according to an embodiment;

FIG. 7A is a flow diagram that illustrates an overview of a method for updating an XML construct in an XML instance managed by the DBMS, according to an embodiment;

FIG. 7B is a flow diagram that illustrates embodiments of several steps depicted in the method of FIG. 7A for updating an XML construct in an XML instance managed by the DBMS; and FIG. 8 is a block diagram that illustrates a computer system upon which an embodiment of the invention may be implemented.

DETAILED DESCRIPTION OF THE INVENTION

Techniques are described for changing XML data in a SQL compliant DBMS. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided for changing data for an XML construct in a SQL/XML compliant DBMS. XML constructs include XML documents, XML elements, XML attributes of XML elements, and fragments of XML documents that include multiple elements at the root level or otherwise do not meet all the requirements of an XML document, among others. The DBMS allows instances of XML type (also called XML instances, herein) to represent XML constructs and allows SQL constructs, such as rows, columns, tables, collections, and LOBs, to store data for XML constructs. In these techniques, an SQL statement is received that includes one or more XML modification operators that operate on a particular component of an instance of XML type. During execution of the SQL statement, the XML modification operator is evaluated by changing the component without changing the entire instance of XML type. For example, an XML delete operator deletes the particular component from the instance of XML type. Other XML operators include an insert operator, an insert-before operator, an append-child operator, and an update operator. In other embodiments, different, more or fewer operators are included. When applied in statements with data manipulation language (DML) operations to change stored data, these operators may be rewritten as SQL operations that operate on SQL constructs, or may be evaluated by updating only some of the SQL constructs, such as the SQL constructs that store data for the particular component, or both.

In one aspect of the invention, the techniques include receiving an SQL statement that includes an operator that operates on a component that is less than all of an instance of XML type. During execution of the SQL statement, the operator is evaluated by modifying content for the component without modifying all of the instance of XML type.

In one aspect of the invention, the techniques include receiving an SQL statement that includes a delete operator. The delete operator operates on a target component of an instance of XML type. During execution of the SQL statement, the delete operator is evaluated by deleting the target component from the instance of XML type.

In another aspect of the invention, an SQL statement is received that includes an insert operator. The insert operator operates on a target component, data that indicates a name, and an expression. The target component is in an instance of XML type, and represents a first XML construct. The data indicates the name of an element for the first XML construct. The expression is for a particular value for XML content. During execution of the SQL statement, the insert operator is evaluated by generating a second component that represents a second XML construct based on the expression. The second XML construct is a child XML element of the target XML construct and has an XML element name based on the data that indicates the name.

According to another aspect of the invention, an SQL statement is received that includes an insert-before operator. The insert-before operator operates on a target component and an expression. The target component is in an instance of XML type, and represents a first XML construct. The expression is for a particular value for XML content. During execution of the SQL statement, the insert-before operator is evaluated by generating a second component that represents a second XML construct based on the expression. The second XML construct is inserted before the first XML construct in the instance of XML type in XML document order.

According to another aspect of the invention, an SQL statement is received that includes an append-child operator. The append child operator operates on a target component and an expression. The target component is in an instance of XML type, and represents a first XML construct. During execution of the SQL statement, the append-child operator is evaluated by generating a second component that represents a second XML construct based on the expression. The second XML construct is a child of the first XML construct in the instance of XML type.

According to another aspect of the invention, an SQL statement is received that includes an update operator. The update operator operates on a component and an expression. The target component is in an instance of XML type, and represents a first XML construct. During execution of the SQL statement, the update operator is evaluated by generating a second component that represents a second XML construct based on the expression. The second XML construct replaces the first XML construct in the instance of XML type.

According to another aspect of the invention, a database modification statement is received to modify a target component in an instance of XML type. During execution of the database modification statement, the database modification statement is evaluated by determining a first portion of the instance of XML type. The first portion is affected by executing the database modification statement, and is less than the entire instance of XML type. The first portion is mapped to a first set of at least one SQL construct. The first set is updated without updating a second set of at least one SQL construct. The second set represents a second portion of the instance of XML type, which is not affected by executing the database modification statement.

According to another aspect of the invention, a database modification statement is received to modify a target component in an instance of XML type. The target component represents a first XML construct. The database modification statement is compiled by determining a particular set of one of more SQL constructs that are affected by the database modification statement. The database modification statement is rewritten as a set of one or more SQL operations that operate on the particular set of one or more SQL constructs. The database modification statement is evaluated by evaluating the set of one or more SQL operations on the particular set of one or more SQL constructs.

Embodiments are described in the following in the context of a commercial SQL/XML database server, which uses object-relational constructs for storage of content for one or more XML constructs, which may represent an XML construct as an instance of XML type, and which responds to SQL statements with standard and non-standard XML functions that operate on XPath expressions identifying XML content to be changed. XPath expressions locate data in an XML document. SQL/XML standard functions that operate on XPath expressions include EXTRACT, EXTRACTVALUE, AND EXISTSNODE, which are well known in the art. Such a commercial SQL/XML DBMS is the Oracle 9i Database Server available from Oracle International Corporation of Redwood Shores, Calif. As used hereinafter, XML functions include non-standard functions with the described behavior as well as the standard functions promulgated by W3C.

However, the invention is not limited to this context, but may be applied in any context involving relational database constructs for storing XML data. For example, embodiments may be employed in an XML database that uses relational database constructs but not object-relational constructs. Embodiments may be employed in an SQL/XML database that is accessed through an application programming interface (API) rather than being accessed as a server that responds to messages sent over a network. In some embodiments, the SQL statement may include data definition language (DDL) operations to change the relational database constructs used to store the XML or non-XML contents.

In some embodiments, another syntax different from XPath may be used to express locations of data within an XML instance; and XML operations different from the named XML functions may be used to combine or compare or change data located in an XML instance. For example, an object notation (in which levels in an object hierarchy are indicated by dots between object names) may be used to express an object-relational data item that corresponds to an XML element or attribute instead of XPath notation (in which levels in an XML hierarchy are indicated by slashes "/" between element names); and the object notation may be used as an argument for an XML function.

Structural Overview

Structures involved in embodiments of the invention include XML documents with XML constructs and SQL constructs. FIG. 1 is a block diagram that illustrates an example system 100 including an example XML document 110, an example associated XML schema 102, and example object-relational constructs that store XML document contents in an object-relational database managed by an object-relational database server 130.

XML document 110 is an instance of a particular XML document type, called hereinafter a "PO" XML document, which describes purchase orders used by an enterprise. For purposes of illustration it is assumed that an example PO document 110 includes an XML element 108 named "purchaseOrder." The purchaseOrder element 108 includes an XML attribute 109 named "orderDate" and XML elements 112a, 112b named "shipTo" and "itemList," respectively. The orderDate attribute 109 holds data that indicates the date that the purchase order was generated by the enterprise. The shipTo element 112a is described in the next paragraph. The itemList element 112b holds data indicating the items purchased. In other embodiments, more or fewer XML attributes and XML elements are included in a purchaseOrder element. Ellipsis 115 indicates that other purchaseOrder elements may be included in the PO XML document. For purposes of illustration, it is assumed that the illustrated PO document includes just one purchaseOrder element.

The shipTo element 112a includes XML attribute 113, named "country," and two XML elements 114a, 114b. The country attribute holds data that indicates the country to which items purchased are to be shipped. The XML element 114a is named "name" and holds data indicating the name of the person to whom items purchased are to be shipped. The XML element 114b is named "street" and holds data indicating the street address to which the items purchased are to be shipped.

The PO type may be described in an XML schema document such as XML schema 102. For example, the XML schema 102 lists several XML constructs used in XML documents of type PO, which include elements purchaseOrder, ShipTo and itemList and attributes orderDate and country, among others. XML schema 102 indicates what type of information is stored in each of these elements and what attributes each element has. Information types nay include, for example, character data, numeric data, and another element, among other types of information. For example, the XML schema 102 specifies that orderDate attribute 109 must hold date data.

Example XML database server 130 is an object-relational database server, which imports and exports XML documents, which represents XML constructs as XML instances, which stores contents for the XML constructs in one or more SQL constructs in database storage space 140, and which uses database memory 132.

The database storage space 140 includes mapping 142 and one or more other SQL constructs, such as table 144 and table 148 for collections, and rows and columns in those tables. In other embodiments, more or fewer SQL constructs are included. For example, some XML constructs may be stored in one or more large objects (LOBs).

XML Database Server 130 stores a mapping 142 between XML elements or attributes and one or more SQL constructs. In some embodiments, as described in Murthy et al., the mapping includes an XML schema with optional notations that indicated SQL construct properties. For example, elements of type shipTo are associated with a shipto column of object type in a PO table 144. The object attributes of the shipto object include a country column, a name column and a street column. Elements of type itemList are associated with column itemlist of collection type in table 144. Metadata associated with the itemlist column indicates that the collection is stored in a separate collection table 148 (also called a "store table"). The itemlist column includes a value (e.g., a set identification) that is used to identify the associated rows in the collection table 148. Although the methods of Murthy et al. allow the column names to differ in any way from the element names, for simplicity in the illustrated embodiment, the column names in Table 144 are lowercase versions of the corresponding element or attribute names in PO type documents. The mapping 142 is used to convert between data in XML documents, like XML document 110, and data in one or more XML type object-relational constructs, such as rows in Table 144.

The database server memory 132 is used to hold data being operated upon by the server. The memory 132, may include volatile and persistent memory. In the illustrated embodiment, the XML database server 130 represents XML constructs as a tree model 134 in the memory 132 of the database server 130. The data structures used to represent the tree model in one embodiment are described in a later section.

New SQL/XML Functions

According to various embodiments, new XML functions enhance the management of XML data in an SQL compliant DBMS by allowing pieces of an XML instance to be changed. For purposes of illustration, five new functions are described. They are called DELETEXML, INSERTXML, INSERTXMLBEFORE, APPENDCHILDXML, and UPDATEXML; but, in other embodiments, any or all of the functions may be given different names or take different forms and more or fewer or different operators may be implemented. For example, instead of a function call, in other embodiments the operations performed by these or other functions may be performed by a separate server in response to a messages sent by the DBMS. The example functions are described in more detail in following sections.

EXAMPLE CONTENTS OF XML DOCUMENT

To illustrate the use of these functions in declarative SQL statements to manage XML data, it is assumed one purchase order stored in one row of PO table 144, and several rows in collection table 148, corresponds to the XML instance listed in Table 1.

TABLE 1

Example XML instance stored in SQL/XML compliant DBMS.

| line | XML instance |
| --- | --- |
| 1 | . . . |
| 2 | <purchaseOrder orderDate = "1999-10-20"> |
| 3 | <shipTo country = "US"> |
| 4 | <name> Alice Smith </name> |
| 5 | <street> 123 Maple Street </street> |
| 6 | </shipTo> |
| 7 | <itemList> |
| 8 | . . . |
| 9 | </itemList> |
| 10 | </purchaseOrder> |

As shown in Table 1, the XML element purchaseOrder begins on line 2 with the angle brackets "<>" marking an opening tag that includes the element name "purchaseOrder". Also included in the opening tag is the name of an attribute, named "orderDate," followed by the symbol "=" which, in turn, is followed by a value for the attribute within quotation marks. The XML element purchaseOrder ends on line 10 with the angle brackets "<>" enclosing the slash "/" that indicates an ending tag, followed by the element name "purchaseOrder". The data on lines 2 through 10 represent the value of the purchaseOrder element. The value of the purchaseOrder element includes two child elements ShipTo, on lines 3 through 6, and itemList, on lines 7 through 9. The element shipTo includes the attribute country and the two child elements of shipTo, e.g., the element "name" on line 4 and the element "street" on line 5. The contents of the element itemList are not shown explicitly, but are represented by the ellipsis on line 8.

Figure 2A:
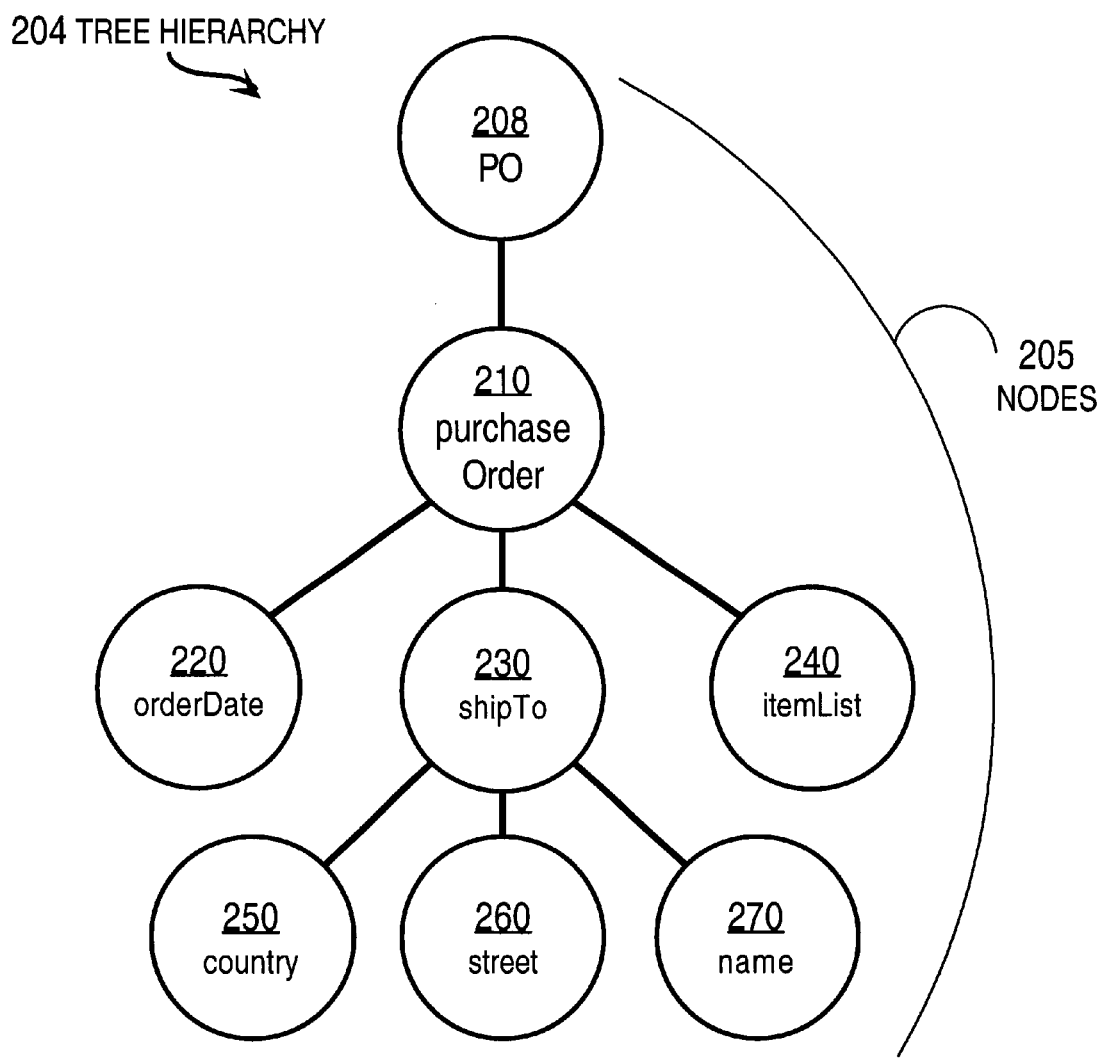
FIG. 2A is a block diagram that illustrates an example tree hierarchy that represents an XML construct.

The data in XML document 110 and instance shown in Table 1 form a tree hierarchy. FIG. 2A is a block diagram that illustrates an example tree hierarchy 204 that represents the XML document 110. The tree 204 includes several nodes 205. Each node may have one or more child nodes descending from it. The top node, which is child of no other node, is the root node of the tree. A node with no child is a leaf node of the tree. Each node represents an XML construct, such as a document, document fragment, element or attribute. A node representing an attribute must be a leaf node. As shown in FIG. 2A, the PO XML document 110 is the root node 208 of the tree hierarchy 204. The root node 208 has one child node 210 that represents the purchaseOrder element 108. The node 210 has three child nodes 220, 230, 240 that represent the orderDate attribute 109, the shipTo element 112a, and the itemList element 112b, respectively. The node 230 has three child nodes 250, 260, 270 that represent the country attribute 113, the street element 114a, and the name element 114b, respectively. The node 240 has one or more child nodes (not shown) that represent the various items that are ordered.

In-memory Representation

FIG. 2B is a block diagram that illustrates in-memory data structures for nodes on a tree hierarchy for an XML construct represented by a DBMS XML instance, according to an embodiment. During some operations, the database server represents some or all of an XML instance in memory. As used hereinafter, memory includes virtual memory, portions of which may be temporarily stored on a persistent storage device. For purposes of illustration, it is assumed that the XML database server 130 uses a tree model 280 of an XML construct to represent all or part of an XML instance in memory.

Each node is represented by a node data structure such as data structures 282a, 282b, and others represented by ellipsis 290, collectively referenced hereinafter as node data structure 282. A node data structure 282 includes a contents portion (such as contents portions 284a, 284b, collectively referenced hereinafter as contents portion 284). The contents portion 282 includes data for the contents of an XML construct represented by the node. In many systems, the contents portion 284 includes the text representation of the contents, such as the text on line 2 of Table 1, either including or excluding the attribute name and value. Any method known in the art for representing the contents of an XML construct may be used.

A node data structure 282 includes a pointer set of zero or more pointers (such as pointer set 286a, 286b, collectively referenced hereinafter as pointer set 286). The pointer set includes a list of pointers to the location in the tree model 280 of child nodes of the node represented by the data structure. For example, if the data structure 282a represents node 230 for the shipTo element, and data structure 282b represents node 250 for the country attribute, which is a child node of the shipTo node (see FIG. 2A), then the pointer set 286a includes a pointer to the data structure 282b, among pointers to other data structures representing the name and street XML elements.

A node data structure 282 includes a bit vector of zero or more bits (such as bit vectors 288a, 288b, collectively referenced hereinafter as bit vector 288). Each bit vector includes one bit corresponding to each pointer in the pointer set 286 in the same node data structure 280. The bit vector 288 is used to indicate which child nodes are changed as a result of operations on the in-memory representation of an XML instance. In the illustrated embodiment, the bits in the bit vector are in the same order as the pointers in the pointer set; a bit value of 0 indicates a corresponding node of the tree has not been changed; and a bit value of 1 indicates the corresponding node has been changed. In other embodiments, the bit vector may include more or fewer bits. For example, in some embodiments the bit vector includes another bit to indicate whether the node represented by the same data structure is changed; while, in other embodiments, the bit vector includes only this one bit to indicate whether the node represented by the same data structure is changed.

In some embodiments the bit vector is omitted. In the illustrated embodiment, the bit vector is included for nodes represented by SQL constructs included in mapping 142, called schema-based mapping; and the bit vector is not included for nodes not stored in SQL constructs, called data object model (DOM) mapping. In DOM mapping, the tree hierarchy is deduced dynamically from an XML construct itself rather than from an XML schema describing a family of XML documents of a particular type. In the illustrated embodiment, a tree model for a DOM mapped construct does not include a bit vector. In other embodiments, a DOM mapping may include a bit vector. In the illustrated embodiment, a schema-based mapping is required to form multiple SQL constructs for storing data for an XML construct. In other embodiments, a schema-based mapping is not required.

The contents of the in-memory model are determined by the root XML element or elements represented by the instance of XML type that is operated upon. The instance of XML type may be originally stored in the database. Alternatively, the instance of XML type may be generated dynamically for temporary use from components in the database (including one or more instances of XML type stored in SQL constructs), or imported from a file that originates outside the database, or both. A schema-based instance of XML type has metadata stored in the mapping 142. The mapping 142 is based on an XML schema for the XML construct in the illustrated embodiment. That metadata is used for converting between the XML constructs in the XML instance and one or more SQL constructs. A non-schema-based instance of XML type has metadata about its corresponding XML constructs within the instance. Temporary instances of XML type are generated dynamically or read from external files and might not be stored in the database.

DELETEXML Operator

A DELETEXML function is useful for deleting an attribute or element in an XML instance managed by an SQL/XML database server. FIG. 3 is a flow diagram that illustrates an overview of a method for deleting XML data from an XML instance managed by the DBMS, according to an embodiment. Although steps are shown in FIG. 3 and subsequent flow diagrams in a particular order, in other embodiments, the steps may be performed in a different order or overlapping in time.

In step 302 an SQL statement is received with a DELETEXML operator that operates on a target component of an XML instance. The target component can be expressed in any manner known in the art. For example, the target component can be identified by an XML instance that represents a root XML, element or elements, and an XPath expression from the root XML elements, to a target XML construct that corresponds to the component.

In the illustrated embodiment, the DELETEXML operator is a DELETEXML function with two arguments which correspond to "operands" of the operator. The first argument identifies an instance of XML type. The second argument is an expression that identifies a particular XML construct or set of XML constructs that constitute a component in the instance of XML type. For purposes of illustration, it is assumed that a particular instance of XML type, called POdoc, shown in Table 1, is generated by the XML database server 130 by selecting rows from the PO table 144 of XML type. In a subsequent SQL statement, the DELETEXML function is called to operate on a target XML construct in the XML instance. For example, the subsequent SQL statement includes the following function call (referenced as F1):

DELETEXML(POdoc, "/purchaseOrder/shipTo") (F1)

which indicates the target XML construct, shipTo, is to be deleted. In the illustrated embodiment, the target XML construct is specified using an XPath expression "/purchaseOrder/shipTo."

The function is to return a modified XML instance with the target XML construct deleted. For example, the function call F1 operating on the XML instance POdoc is to change the XML instance to the value as shown in Table 2—with the shipTo element eliminated.

TABLE 2

Example modified XML instance generated by example function call F1.

| line | Modified XML instance |
|---|---|
| 1 | ... |
| 2 | <purchaseOrder orderDate = "1999-10-20"> |
| 3 | itemList> |
| 4 | ... |
| 5 | </itemList> |
| 6 | </purchaseOrder> |

In step 304 the SQL statement with the DELETEXML function is compiled and prepared for evaluation. Step 304 includes determining whether the SQL statement includes data manipulation language (DML) operations that indicate that the revised XML instance is to be stored in the database. If the revised XML instance is not to be stored in the database, then the function is not rewritten during compilation and control flows directly to step 308. Step 304 includes determining whether the XML instance in the first argument is schema-based or non-schema-based and determining whether the SQL statement with the DELETEXML function can be rewritten as SQL operations on SQL constructs without the DELETEXML function. If the statement can be so rewritten, control passes to step 322 to change the SQL constructs. If the statement cannot be so rewritten, control passes to step 308. Details for step 304 are similar to those described in a later section with reference to step 710a in FIG. 7B.

In step 308, the in-memory representation of the XML instance is generated. If the XML instance is non-schema based, then a data object model (DOM) data structure is used as the in-memory representation of the XML instance. In the DOM data structure, each node data structure representing an XML element has a list of children (such as pointer set 286) that includes each attribute and each child element of the XML element. If the XML instance is schema-based, e.g., it is stored in one or more SQL constructs with metadata for the conversion in a mapping 142, then a schema-based data structure is used as the in-memory representation of the XML instance. A schema-based data structure representing an XML element includes, in addition to a list of child nodes (such as pointer set 286), a bit vector equal in length to the number of its child nodes. The bit corresponding to a particular child indicates whether that child node has been modified.

In step 310, the compiled DELETXML function is evaluated. Step 310 includes modifying the in memory representation and then returning the revised XML instance. Modifying the in-memory representation includes traversing the in-memory tree model 280 to find a target node that corresponds to the target XML construct, based on the second argument of the function call. For the DELETEXML function, the target XML construct need not be a unique node, e.g., several sibling nodes may be indicated by the second argument of the function call. The target XML construct, and all its descendents, are eliminated as children of the parent of the target XML construct (the orphaned data structures 282 need not be erased or removed).

According to one embodiment of step 310, it is determined whether the target node is the root node of the XML instance. If so, an error is raised, which is to be handled by the database server; for example, an error message is sent to a database client. If the target node is not the root node, the target node is deleted as a child of the parent node. In the illustrated example, the pointer set 286a in the node data structure 282a for purchaseOrder node 210, which is the parent node of the deleted target node, shipTo node 230, is modified. For example, the pointer to the deleted child node is replaced with a null value.

During step 310 the bit vector in the node data structure for the parent node of the target node is also updated, if present. In the illustrated embodiment, if the XML instance is one already stored as an SQL construct of XML type, then the in-memory representation, tree model 280, includes in each node data structure 282 the bit vector 288 to indicate child nodes that are modified. In the illustrated example, the bit vector 288a in the node data structure 282a for purchaseOrder node 210, which is the parent node of the deleted target node, shipTo node 230, is modified so that the bit corresponding to the delete child node is set to "1"

Step 320 represents a branch point in the program flow that is encountered if the modified XML instance is to be stored; if the modified XML instance is not to be stored, steps 320, 322, 330 may be omitted. If the XML instance is not already stored as an SQL construct of XML type, then control passes to step to step 330 to store the modified XML instance based on the in-memory representation, generating a new mapping 142 and SQL constructs as necessary. If the XML instance is already stored as an SQL construct of XML type, then control passes to step 322. In the illustrated example, the XML instance POdoc is a newly generated instance, so control passes to step 330.

If the first argument in the function call were a purchaseOrder element stored in the PO table 144, then the bit vectors 288 would be included in each node data structure 282 and control would pass to step 322.

In step 322, an SQL construct that includes data for the target XML construct is changed to remove that data. In one embodiment, every column in the row representing the purchaseOrder element would be updated, including every column in one row of table 144 and several rows in the collection table 148 associated with the row in table 144.

In embodiments using dirty-bit optimization, described in more detail below with reference to FIG. 7B, only SQL constructs associated with a node that has changed is updated. Thus fewer SQL constructs might be updated. For example, the mapping 142 is used to determine that the bit set to "1" is in a position that indicates the shipTo child element of the purchaseOrder element. Therefore, the database server knows that the shipTo element has been deleted from table 144. The mapping 142 also indicates that the shipTo element includes an attribute and two child elements stored as columns country, name, and street in table 144. In one embodiment, these three columns of the shipTo object in table 144 are set to null. In another embodiment, an "object present" column corresponding to the shipTo object is set to null.

In step 330, the modified instance from the in-memory representation is stored. For example, the XML instance listed in Table 2 is stored. If it is to be stored as a schema-based instance, a schema-based mapping is generated and corresponding SQL constructs are generated and filled with the contents of the in-memory representation. In some embodiments, step 330 is omitted because the changed XML instance is used only temporarily—in the form of the in-memory representation, and is not stored in the database.

INSERTXML Operator

Figure 4:
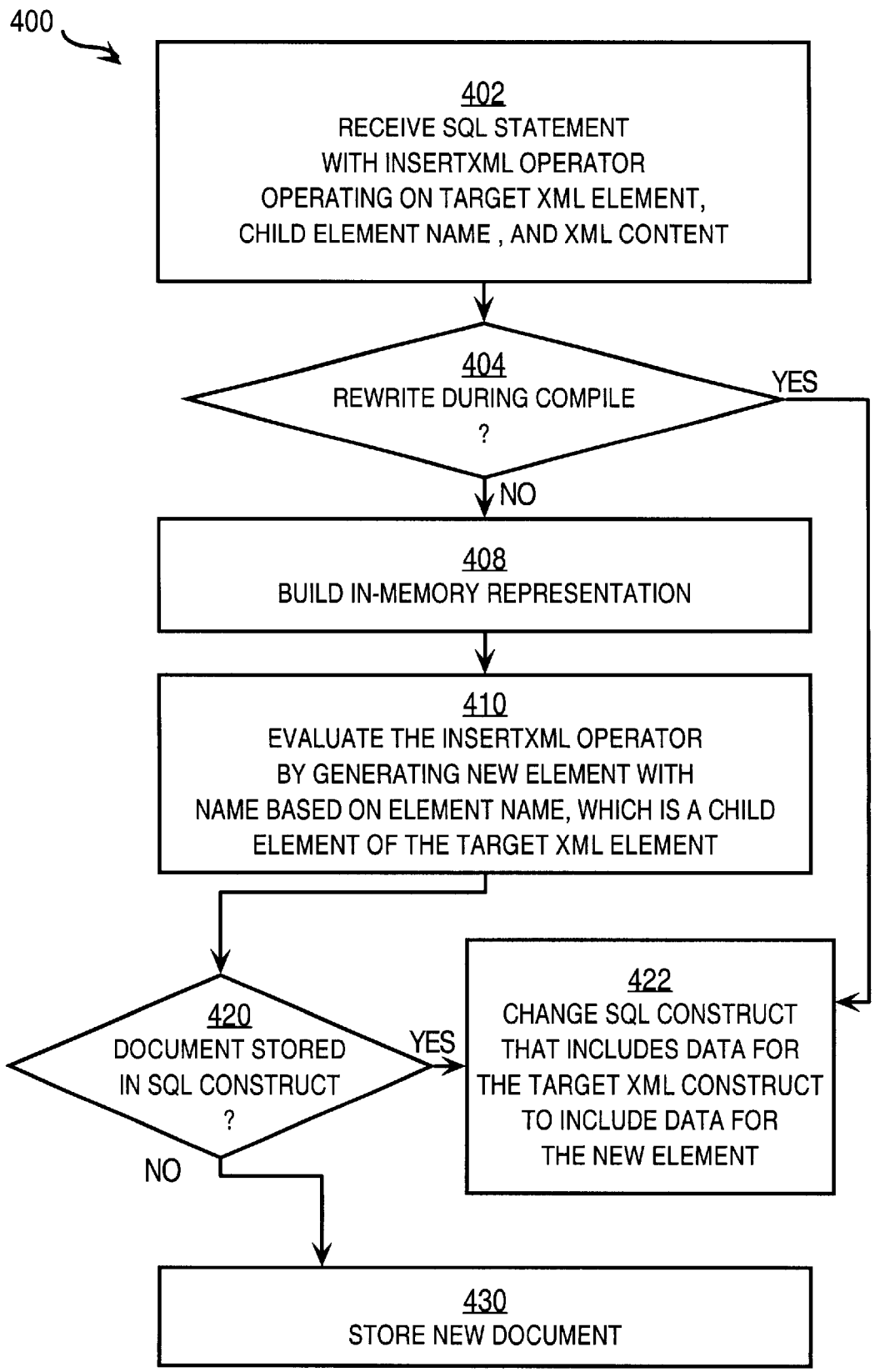
FIG. 4 is a flow diagram that illustrates an overview of a method for inserting an XML element into an XML instance managed by the DBMS, according to an embodiment.

AN INSERTXML function is useful for inserting an attribute or element in an XML instance managed by an SQL/XML database server. FIG. 4 is a flow diagram that illustrates an overview of a method 400 for inserting an XML element into an XML instance managed by the DBMS, according to an embodiment.

In step 402 an SQL statement is received with an INSERTXML operator that operates on a target component of an XML instance. The target component can be expressed in any manner known in the art.

In the illustrated embodiment, the INSERTXML operator is an INSERTXML function with four arguments, which correspond to "operands" of the operator. The first argument identifies an XML instance. The second argument is an expression that identifies a target XML element (not an attribute) that constitutes a component in the XML instance. The third argument is data that indicates a name for a new element to be inserted in the XML instance as a child of the target element, and the fourth argument gives the contents for the new element. The third argument can be given in any form known in the art, such as a string of characters enclosed in single or double quotation marks, with or without a character set identifier. The contents for the element in the fourth argument can be any data that is converted to XML type, including an expression that generates such data, such as an XML generation function. In some embodiments, the expression can include a separate namespace that defines rules for the elements and attributes used in the forth argument For example, after the POdoc instance is generated, as described above (for the DELETEXML operator), the INSERTXML function is called to operate on a target XML construct in POdoc. For example, a SQL statement includes the following function call (referenced as F2):

INSERTXML(POdoc, "/purchaseOrder/itemList", "item",

XMLTYPE('<itemName>ink cartridge</itemName>'))  (F2)

which indicates the target XML construct, itemList, is to have a child element named "item" with contents given by the last argument. In the illustrated embodiment, the target XML construct is specified using an XPath expression "/purchaseOrder/itemList." The XMLTYPE function in the last argument converts to XML type the text string given between the single quotes inside the parentheses that follow the XMLTYPE function name. The XMLTYPE function parses the text to determine one or more nodes of a sub-tree represented by the value. If the text does not represent a valid XML element, then an error is raised.

The function is to return a modified instance with a new element as a child of the target XML. For example, the function call F2 operating on the POdoc shown in Table 1 is to produce a modified XML instance as shown in Table 3 with the new item element in line 10.

TABLE 3

Example modified XML instance
generated by example function call F2.

| line | modified XML instance |
|---|---|
| 1 | . . . |
| 2 | <purchaseOrder orderDate = "1999-10-20"> |
| 3 |   <shipTo country = "US"> |
| 4 |     <name> Alice Smith </name> |
| 5 |     <street> 123 Maple Street </street> |
| 6 |   </shipTo> |
| 7 |   <itemList> |
| 8 |     . . . |
| 9 |     <item> |
| 10 |       <itemName>ink cartridge</itemName> |
| 11 |     </item> |
| 12 |   </itemList> |
| 13 | </purchaseOrder> |

It is assumed for purposes of illustration that the ellipsis on line 8 represents one or more other item elements already included in the itemList element.

In the illustrated embodiment, INSERTXML function is to make the new element the next child of the target XML element, if no other child in of the target XML element already has the name given in the third element. If another child of the target XML element already has the name given in the third element, the new child is to be placed in the instance following the last child with that name and before any other child elements with a different name. For example if the ellipsis in line 8 represents two child XML elements of itemList, a first one name "item" and a second named "cost," then the new item element would be inserted between those two XML elements.

In step 404 the SQL statement with the INSERTXML function is compiled and prepared for evaluation. Step 404 includes determining whether the SQL statement includes data manipulation language (DML) operations that indicate that the revised XML instance is to be stored in the database. If the revised XML instance is not to be stored in the database, then the function is not rewritten during compilation and control flows directly to step 408. Step 404 includes determining whether the XML instance in the first argument is schema-based or non-schema based and determining whether the SQL statement with the INSERTXML function can be rewritten as SQL operations on SQL constructs without the INSERTXML function. If the statement can be so rewritten, control passes to step 422 to change the SQL constructs. If the statement cannot be so rewritten, control passes to step 408. Details for step 404 are similar to those described in a later section with reference to step 710a in FIG. 7B.

In step 408, the in-memory representation of the XML instance is generated. The process for preparing the in-memory representation is the same as the same process described above (for the DELETEXML function).

In step 410, the compiled INSERTXML function is evaluated. Step 410 includes modifying the in memory representation and then returning the revised XML instance. Modifying the in-memory representation includes traversing the in-memory tree model 280 to find a target node that corresponds to the target XML construct, based on the second argument of the function call. For the INSERTXML function, the target XML construct is required to be a unique node and an XML element. The new XML element is added as a child element of the target XML element.

According to one embodiment of step 410, it is determined whether the target node is an XML attribute. If so, an error is raised, which is to be handled by the database server; for example, an error message is sent to a database client. If the target node is an element, rather than an attribute, the new node is inserted as a child of the target node. A new node data structure, e.g., node data structure 282b, is formed for the new element. If necessary, additional node data structures are generated based on the sub-tree of nodes contained in the fourth argument and pointers are added to the pointer set of the node data structure of the parent node. For example, another node data structure is formed for the sub element itemName and a pointer to the node data structure for the element itemName is added to the pointer set 286b in node data structure 282b. At least, if there is no error, the pointer set 286a in the node data structure 282a for itemList node 240, which is the target node, is modified to add a pointer to the node data structure 282b for the new item element.

During step 410 the bit vector in the node data structure for the target node is also updated, if present. In the illustrated embodiment, if the XML instance is one already stored as an SQL construct of XML type, then the in-memory representation, tree model 280, includes in each node data structure 282 the bit vector 288 to indicate child nodes that are modified in the illustrated example, the bit vector 288a in the node data structure 282a for the itemList node 240, which is the target node, is modified so that the bit corresponding to the new XML element is set to "1".

Step 420, represents a branch point in the program flow that is encountered if the modified XML instance is to be stored; if the modified XML instance is not to be stored, steps 420, 422, 430 may be omitted. If the XML instance is not already stored as an SQL construct of XML type, then control passes to step 430 to store the modified XML instance based on the in-memory representation. If the XML instance is already stored as an SQL construct of XML type, then control passes to step 422. In the illustrated example, the XML instance POdoc is a newly generated instance, so control passes to step 430.

If the first argument in the function call were a purchaseOrder element stored in the PO table 144, then the bit vectors 288 would be included in each node data structure 282 and control would pass to step 422.

In step 422, an SQL construct that includes data for the target XML construct is changed to add data for the new child node. In one embodiment, every column in the row representing the purchaseOrder element would be updated, including every column in one row of table 144 and several rows in the collection table 148 associated with the row in table 144.

In embodiments using dirty-bit optimization, described in more detail below with reference to FIG. 7B, only SQL constructs associated with a node that has changed is updated. Thus fewer SQL constructs might be updated. For example, the mapping 142 is used to determine that the bit set to "1" is in a position that indicates an item in the itemList element. The metadata indicates that the itemList element is stored as a collection of items in store table 148. Therefore, the database server knows that the store table 148 must be changed to include the item indicated by the bit set to "1." Since the marked bit is past the last extant item in the collection table for the purchaseOrder instance, a new row representing the new item is added to the store table 148. The new row includes a setid, which corresponds to a value stored in the itemList column of PO table 144, and the value for an itemName column of the collection table. If itemName is not already a column of collection table 148, then a new collection table is generated that includes an itemName column, and the new item is added to the new collection table. In one embodiment, all the other items in the itemList are transferred to the new table.

In step 430, the modified instance from the in-memory representation is stored. For example, the XML instance listed in Table 3 is stored. If it is to be stored as a schema-based instance, a schema-based mapping is generated and corresponding SQL constructs are generated and filled with the contents of the in-memory representation. In some embodiments, step 430 is omitted because the changed XML instance is used only temporarily—in the form of the in-memory representation.

INSERTXMLBEFORE Operator

Figure 5:
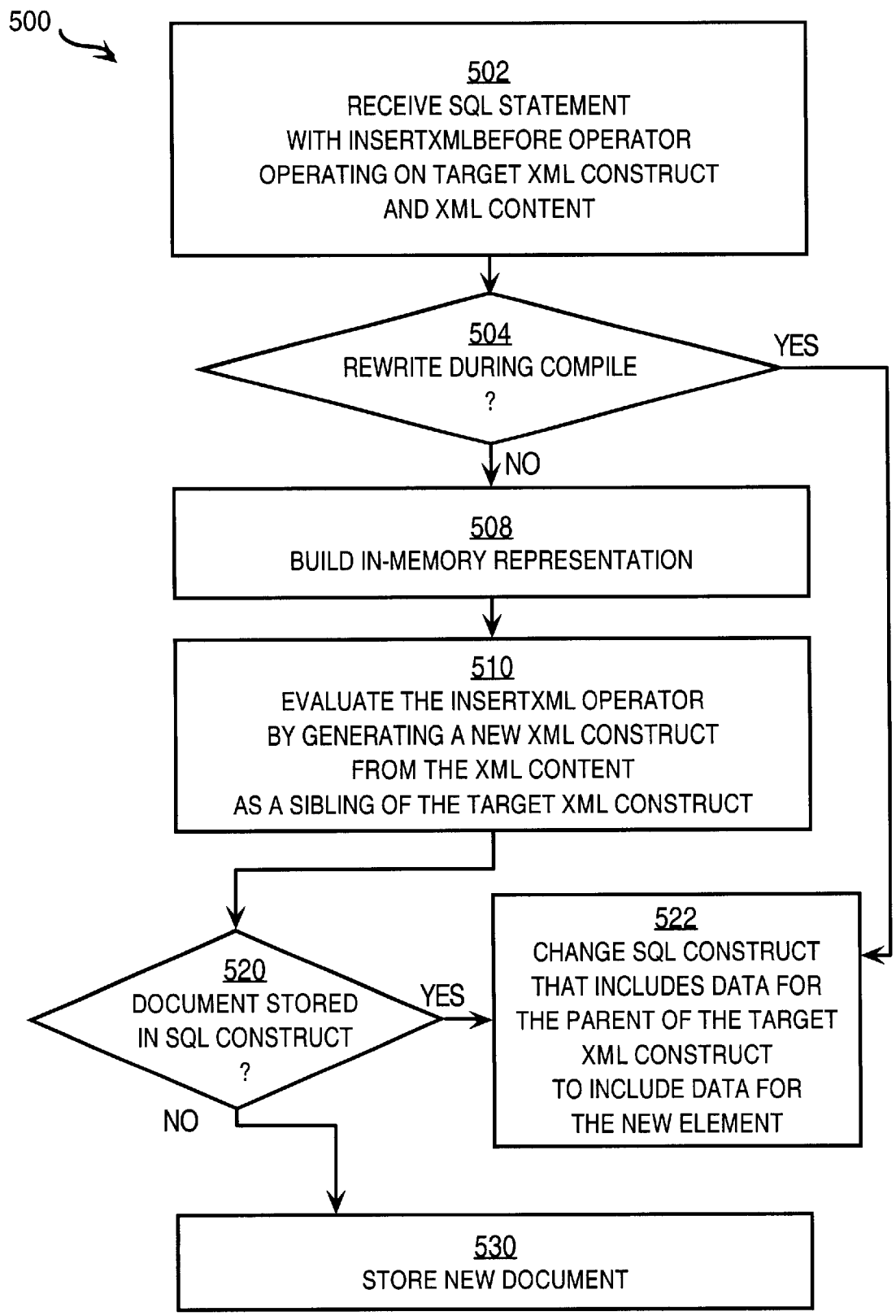

An INSERTXMLBEFORE function is useful for inserting an attribute or element in an XML instance managed by an SQL/XML database server. FIG. 5 is a flow diagram that illustrates an overview of a method 500 for inserting XML data before a particular XML construct in an XML instance managed by the DBMS, according to an embodiment.

In step 502 an SQL statement is received with an INSERTXMLBEFORE operator that operates on a target component of an XML instance. The target component can be expressed in any manner known in the art.

In the illustrated embodiment, the INSERTXMLBEFORE operator is an INSERTXMLBEFORE function with three arguments, which correspond to "operands" of the operator. The first argument identifies an XML instance. The second argument is an expression that identifies a target XML construct that constitutes a component in the XML instance. The third argument gives the data for a new XML construct, including any tags. The data in the third argument can be any data that is converted to XML type, including an expression that generates such data, as described above.

For example, after the POdoc instance of Table 1 is generated, the INSERTXMLBEFORE function is called to operate on a target XML construct in POdoc. For example, a SQL statement includes the following function call (referenced as F3):

INSERTXMLBEFORE(POdoc; "/purchaseOrder/shipTo",

XMLTYPE('<cust>ABC Corp.</cust>'))    (F3)

which indicates the target XML construct, shipTo, is to have an XML construct defined by the contents given by the last argument inserted before it in XML document order. In the illustrated embodiment, the target XML construct is specified using an XPath expression "/purchaseOrder/shipTo." The XMLTYPE function in the last argument converts to XML type the text string given between the single quotes inside the parentheses that follow the XMLTYPE function name. The XMLTYPE function parses the text to determine whether the text represents an attribute or an element including any sub elements.

The function is to return a modified instance with a new XML construct before the target XML construct. For example, the function call F3 operating on the POdoc shown in Table 1 is to produce a modified XML instance as shown in Table 4 with the new cust element in line 3.

TABLE 4

Example modified XML instance generated by example function call F3.

| line | modified XML instance |
|---|---|
| 1 | ... |
| 2 | <purchaseOrder orderDate = "1999-10-20"> |
| 3 | <cust>ABC Corp.</cust> |
| 4 | <shipTo country = "US"> |
| 5 | <name> Alice Smith </name> |
| 6 | <street> 123 Maple Street </street> |
| 7 | </shipTo> |
| 8 | <itemList> |
| 9 | ... |
| 10 | </itemList> |
| 11 | </purchaseOrder> |

If the target is an XML attribute, the new XML construct is also an attribute. For example, a SQL statement may include the following function call (referenced as F4):

INSERTXMLBEFORE(POdoc, "/purchaseOrder/@orderDate",

XMLTYPE('num="7890"'))    (F4)

The function call F4 operating on the POdoc shown in Table 1 is to produce a modified XML instance as shown in Table 5 with the new attribute in line 2.

TABLE 5

Example modified XML instance generated by example function call F4.

| line | modified XML instance |
|---|---|
| 1 | ... |
| 2 | <purchaseOrder num = "7890" orderDate = "1999-10-20"> |
| 3 | <shipTo country = "US"> |
| 4 | <name> Alice Smith </name> |
| 5 | <street> 123 Maple Street </street> |
| 6 | </shipTo> |
| 7 | <itemList> |
| 8 | ... |

TABLE 5-continued

Example modified XML instance generated by example function call F4.

| line | modified XML instance |
|---|---|
| 9 | </itemList> |
| 10 | </purchaseOrder> |

In step 504 the SQL statement with the INSERTXMLBEFORE function is compiled and prepared for evaluation. Step 504 includes determining whether the SQL statement includes data manipulation language (DML) operations that indicate that the revised XML instance is to be stored in the database. If the revised XML instance is not to be stored in the database, then the function is not rewritten during compilation and control flows directly to step 508. Step 504 includes determining whether the XML instance in the first argument is schema-based or non-schema-based and determining whether the SQL statement with the INSERTXMLBEFORE function can be rewritten as SQL operations on SQL constructs without the INSERTXMLBEFORE function. If the statement can be so rewritten, control passes to step 522 to change the SQL constructs. If the statement cannot be so rewritten, control passes to step 508. Details for step 504 are similar to those described in a later section with reference to step 710a in FIG. 7B.

In step 508, the in-memory representation of the XML instance is generated. The process for preparing the in-memory-representation is the same as the same process described above (for the DELETEXML function).

In step 510, the compiled INSERTXMLBEFORE function is evaluated. Step 510 includes modifying the in memory representation and then returning the revised XML instance. Modifying the in-memory representation includes traversing the in-memory tree model 280 to find a target node that corresponds to the target XML construct, based on the second argument of the function call. For the INSERTXMLBEFORE function, the target XML construct is required to be a unique node. The new XML construct is added before the target construct as a sibling of the target construct.

According to one embodiment of step 510, it is determined whether the target node has a parent node. If not, an error is raised.

If the target node has a parent node, then it is determined whether the target node represents an XML attribute or an XML element. A node that represents an element that holds only text, and no other elements, is called a text node. If the target node represents neither an XML attribute nor an XML element, then an error is raised.

If the target node represents an XML element or is a text node, then the XML type value indicated by the third argument is used to generate a child XML element of the parent node that occurs before the target node in XML document order. If the XML type value does not include element tags or is otherwise improper for representing an XML element, then an error is raised. If an error is not raised, then a new node data structure 282 is formed for the new node, and a pointer to the new node data structure is added to the pointer set 286 of the node data structure representing the parent of the target node.

If the target node represents an XML attribute, then the XML type value indicated by the third argument is used as an attribute of the parent node that occurs before the target node in XML document order. If the XML type value does not include attribute name or equal sign or is otherwise improper for representing an XML attribute then an error is raised. If an error is not raised, then a new node data structure 282 is formed for the new node, and a pointer to the new node data structure is added to the pointer set 286 of the node data structure representing the parent of the target node.

During step 510 the bit vector in the node data structure for the parent node of the target node is also updated, if present.

Step 520 represents a branch point in the program flow that is encountered if the modified XML instance is to be stored; if the modified XML instance is not to be stored, steps 520, 522, 530 may be omitted. If the XML instance is not already stored as an SQL construct of XML type, then control passes to step 530 to store the modified XML instance based on the in-memory representation. If the XML instance is already stored as an SQL construct of XML type, then control passes to step 522. In the illustrated example, the XML instance POdoc is a newly generated instance, so control passes to step 530.

If the first argument in the function call were a purchaseOrder element stored in the PO table 144, then the bit vectors 288 would be included in each node data structure 282 and control would pass to step 522.

In step 522, an SQL construct that includes data for the target XML construct is changed to add data for the new sibling node of the XML construct. In one embodiment, every column in the row representing the purchaseOrder element would be updated, including every column in one-row of table 144 and several rows in the collection table 148 associated with the row in table 144.

In embodiments using dirty-bit optimization, described in more detail below with reference to FIG. 7B, only SQL constructs associated with a node that has changed is updated. Thus fewer SQL constructs might be updated. For example, the pointer set is used to determine that the bit set to "1" in the purchaseOrder element indicates the new XML construct is a new XML element named "cust" (for function call F3) or a new attribute named "num" (for Function call F4). If the mapping 142 does not include the new attribute or element for the XML element purchaseOrder, then the new attribute or elements are added to the mapping and new columns are added to PO table 144; or a new table is generated with columns that correspond to the new attribute or element. If the mapping 142 does include SQL constructs associated with the inserted attribute or element, the value in the associated SQL construct is changed from null to a value included within the third argument.

In step 530, the modified instance from the in-memory representation is stored. For example, the modified XML instance listed in Table 4 or Table 5 is stored. If it is to be stored as a schema-based instance, a schema-based mapping is generated and corresponding SQL constructs are generated and filled with the contents of the in-memory representation. In some embodiments, step 530 is omitted because the changed XML instance is used only temporarily—in the form of the in-memory representation.

APPENDCHILDXML Operator

An APPENDCHFLDXML function is useful for inserting an XML element as a child of another XML element in an XML instance managed by an SQL/XML database server. FIG. 6 is a flow diagram that illustrates an overview of a method 600 for inserting XML data as a child element of a XML element in an XML instance managed by the DBMS, according to an embodiment.

In step 602 an SQL statement is received with an APPENDCHILDXML operator that operates on a target component of an XML instance. The target component can be expressed in any manner known in the art.

In the illustrated embodiment, the APPENDCHILDXML operator is an APPENDCHILDXML function with three arguments, which correspond to "operands" of the operator. The first argument identifies an XML instance The second argument is an expression that identifies a target XML construct that constitutes a component in the XML instance. The third argument gives the data for a new XML construct, including any tags. The data in the third argument can be any data that, is converted to XML type, including an expression that generates such data, as described above.

For example, after the POdoc instance of Table 1 is generated, the APPENDCHILDXML function is called to operate on a target XML construct in Podoc. For example, a SQL statement includes the following function call (referenced as F5):

APPENDCHILDXML (POdoc, "/purchaseOrder/shipTo",

XMLTYPE('<city>Springfield</city>'))  (F5)

which indicates the target XML construct, shipTo, is to have an XML construct appended as a last child XML construct with contents given by the last argument. In the illustrated embodiment, the target XML construct is specified using the XPath expression "/purchaseOrder/shipTo."

The function is to return a modified instance with a new XML element appended as a last child of the target XML element. For example, the function call F5 operating on the POdoc shown in Table 1 is to produce a modified XML instance as shown in Table 6 with the new city element in line 6.

TABLE 6

Example modified XML instance generated by example function call F5.

| line | Modified XML instance |
|---|---|
| 1 | ... |
| 2 | <purchaseOrder orderDate = "1999-10-20"> |
| 3 | shipTo   country = "US"> |
| 4 | <name> Alice Smith </name> |
| 5 | <street> 123 Maple Street </street> |
| 6 | city>Springfield</city> |
| 7 | </shipTo> |
| 8 | <itemList> |
| 9 | ... |
| 10 | </itemList> |
| 11 | </purchaseOrder> |

In step 604 the SQL statement with the APPENDCHILDXML function, is compiled and prepared for evaluation. Step 604 includes determining whether the SQL statement includes data manipulation language (DML) operations that indicate that the revised XML instance is to be stored in the database. If the revised XML instance is not to be stored in the database, then the function is not rewritten during compilation and control flows directly to step 608. Step 604 includes determining whether the XML instance in the first argument is schema-based or non-schema-based and determining whether the SQL statement with the APPENDCHILDXML function can be rewritten as SQL operations on SQL constructs without the APPENDCHELDXML function. If the statement can be so rewritten, control passes to step 622 to change the SQL constructs. If the statement cannot be so rewritten, control passes to step 608. Details for step 604 are similar to those described in more detail in a later section with reference to step 710a in FIG. 7B.

In step 608, the in-memory representation of the XML instance is generated. The process for preparing the in-memory representation is the same as the same process described above (for the DELETEXML function).

In step 610, the compiled APPENDCHILDXML function is evaluated. Step 610 includes modifying the in memory representation and then returning the revised XML instance. Modifying the in-memory representation includes traversing the in-memory tree model 280 to find a target node that corresponds to the target XML construct, based on the second argument of the function call. For the APPEND-CHILDXML function, the target XML construct is required to be a unique node.

According to one embodiment of step 610, it is determined whether both the target node is an XML element and the third argument expresses an XML element. If not, an error is raised.

If both represent XML elements, then the XML type value indicated by the third argument is used to generate a child XML element of the target node. A new node data structure 282 is formed for a new node representing the new XML element, and a pointer to the new node data structure is added to the pointer set 286 of the node data structure representing the target node.

During step 610 the bit vector in the node data structure for the target node is also updated, if present.

Step 620 represents a branch point that is encountered if the modified XML instance is to be stored; if the modified XML instance is not to be stored, steps 620, 622, 630 may be omitted. If the modified XML instance is not already stored as an SQL construct of XML type, then control passes to step 630 to store the modified XML instance based on the in-memory representation. If the XML instance is already stored as an SQL construct of XML type, then control passes to step 622. In the illustrated example, the XML instance POdoc is a newly generated instance, so control passes to step 630.

If the first argument in the function call were a purchase-Order element stored in the PO table 144, then the bit vectors 288 would be included in each node data structure 282 and control would pass to step 622.

In step 622, an SQL construct that includes data for the target XML construct is changed to add data for the child node of the XML construct. In one embodiment, every column in the row representing the purchaseOrder element would be updated, including every column in one row of table 144 and several rows in the collection table 148 associated with the row in table 144.

In embodiments using dirty-bit optimization, described in more detail below with reference to FIG. 7B, only SQL constructs associated with a node that has changed is updated. Thus fewer SQL constructs might be updated. For example, the pointer set is used to determine that the bit set to "1" in the shipTo element indicates the new XML construct is a new XML element named "city." If the mapping 142 does not include the new city element for the XML element shipTo, then the new element is added to the mapping and new columns are added to PO table 144; or a new table is generated with columns that correspond to the new element. If the mapping 142 does include SQL constructs associated with the inserted element, the value in the associated SQL construct is changed from null to a value included within the third argument.

In step 630, the modified instance from the in-memory representation is stored. For example, the modified XML instance listed in Table 6 is stored. If it is to be stored as a schema-based instance, a schema-based mapping is generated and corresponding SQL constructs are generated and filled with the contents of the in-memory representation. In some embodiments, step 630 is omitted because the changed XML instance is used only temporarily—in the form of the in-memory representation.

UPDATEXML Operator

An UPDATEXML function is useful for replacing an element that already resides in an XML instance managed by an SQL/XML database server. FIG. 7A is a flow diagram that illustrates an overview of a method 700 for updating an XML construct in an XML instance managed by the DBMS, according to an embodiment.

In step 702 an SQL statement is received with an UPDATEXML operator that operates on a target component of an XML instance. The target component can be expressed in any manner known in the art.

In the illustrated embodiment, the UPDATEXML operator is an UPDATEXML function with three arguments, which correspond to "operands" of the operator. The first argument identifies an XML instance. The second argument is an expression that identifies a target XML construct that constitutes the component in the XML instance. The third argument gives the data for a new XML construct, including any tags. The data in the third argument can be any data that is converted to XML type, including an expression that generates such data, as described above.

For example, after the POdoc instance of Table 1 is generated, the UPDATEXML function is called to operate on a target-XML construct in POdoc. For example, a SQL statement includes the following function call (referenced as F5):

UPDATEXML (POdoc, "/purchaseOrder/shipTo", XML-TYPE ('<shipTo country="Brazil"><name>Pele</name></shipTo>')) (F6)

which indicates the target XML construct, shipTo, is to be replaced by an XML construct given by the last argument. In the illustrated embodiment, the target XML construct is specified using the XPath expression "/purchaseOrder/shipTo."

The function is to return a modified instance with a new XML construct in place of the target XML construct. For example, the function call F6 operating on the POdoc shown in Table 1 is to produce a modified XML instance as shown in Table 7 with the replacement construct on lines 3 through 5.

TABLE 7

Example modified XML instance
generated by example function call F6.

| line | modified XML instance |
|---|---|
| 1 | . . . |
| 2 | <purchaseOrder orderDate = "1999-10-20"> |
| 3 | <shipTo country = "Brazil"> |
| 4 | <name>Pele</name> |
| 5 | </shipTo> |
| 6 | <itemList> |
| 7 | . . . |

TABLE 7-continued

Example modified XML instance
generated by example function call F6.

| line | modified XML instance |
|---|---|
| 8 | </itemList> |
| 9 | </purchaseOrder> |

In step 710 the SQL statement with the UPDATEXML function is compiled and prepared for evaluation. Step 710 includes determining whether the SQL statement includes data manipulation language (DML) operations that indicate that the revised XML instance is to be stored in the database. If the revised XML instance is not to be stored in the database, then the function is not rewritten during compilation and control flows directly to step 720. Step 710 includes determining whether the XML instance in the first argument is schema-based or non-schema-based and determining whether the SQL statement with the UPDATEXML function can be rewritten as SQL operations on SQL constructs without the UPDATEXML function. If the statement can be so rewritten, control passes to step 740 to change the SQL constructs. If the statement cannot be so rewritten, control passes to step 720. Step 710 is described in more detail in a later section with reference to FIG. 7B.

In step 720, the compiled UPDATEXML function is evaluated. Step 720 includes modifying the in memory representation and then returning the revised XML instance. Modifying the in-memory representation includes the step of generating the in-memory representation of the XML instance and traversing the in-memory tree model 280 to find a target node that corresponds to the target XML construct, based on the second argument of the function call. For the UPDATEXML function, the target XML construct is required to be a unique node.

According to one embodiment of step 720 the following steps are performed. If the target node does not have a parent, the entire XML instance is replaced by the XML type value provided as the third argument. If the target node has a parent node, the type of the target node is determined.

If the target node represents an XML element (including a text node), then it is determined whether the XML type value in the third argument is an XML element (including a text node). If so, then the XML type value is added as a child of a parent node of the target node in place of the target node. For example, a pointer to the node data structure 282b of the target node, in the point er set 286a of the node data structure 282a of the parent node, is replaced by a pointer to a new node data structure for a root node within the XML type value. If it is determined above that the XML type value in the third argument is an XML attribute, then an error is raised.

If the target node-represents an XML attribute, then it is determined whether the XML type value in the third argument is an XML attribute. If not, then an error is raised. If the XML type value in the third argument is an XML attribute, then the XML type value is added as a child of a parent node of the target node in place of the target node. For example, a pointer to the node data structure 282b of the target node is replaced by a pointer to a new node data structure for the attribute determined from the XML type value.

During step 720 the bit vector in the node data structure for the parent node of the target node is also updated, if present, to indicate the new child node is a modified child node.

Step 730, represents a branch point in the program flow that is encountered if the modified XML instance is to be stored; if the modified XML instance is not to be stored; steps 730, 740, 750 may be omitted. If the XML instance is not already stored as an SQL construct of XML type, then control passes to step 750 to return the modified XML instance based on the in-memory representation. If the XML instance is already stored as an SQL construct of XML type, then control passes to step 740. In the illustrated example, the XML instance POdoc is a newly generated instance, so control passes to step 750.

If the first argument in the function call were a purchaseOrder element stored in the PO table 144, then the bit vectors 288 would be included in each node data structure 282 and control would pass to step 740.

In step 740, an SQL construct that includes data for the target XML construct is changed to add data for the child node of the XML construct. In one embodiment, every column in the row representing the purchaseOrder element would be updated, including every column in one row of table 144 and several rows in the collection table 148 associated with the row in table 144.

In embodiments using dirty-bit optimization, described in more detail below with reference to FIG. 7B, only SQL constructs associated with a node that has changed is updated. Thus fewer SQL constructs might be updated. For example, the pointer set is used to determine that the bit set to "1" in the purchaseOrder element indicates the modified XML construct is the shipTo element. The mapping 142 includes the shipTo element with a country attribute and a name element as a child element of the purchaseOrder element, so no new columns need be added to PO table 144; and no new table need be generated. The value in the associated SQL construct is changed from former values to the new values; if a new value is missing of any child of the new node, the column is filled with a null value. For example, the contents of the country column is set to Brazil, the name column is set to Pele and the street column is set to null.

In step 750, the modified instance from the in-memory representation is stored. For example, the modified XML instance listed in Table 7 is stored. If it is to be stored as a schema-based instance, a schema-based mapping is generated and corresponding SQL constructs are generated and filled with the contents of the in-memory representation. In some embodiments, step 750 is omitted because the changed XML instance is used only temporarily—in the form of the in-memory representation.

Storing the Modified XML Instance

In some embodiments, storing results from evaluating the operators described above involves manifesting the old instance in memory, updating the in-memory representation to return a modified instance, and then generating new SQL constructs to store the modified instance, as in steps 330, 430, 530, 630 and 750. However, when at least a portion of the instance being updated is already stored object relationally using a mapping 142, such as the schema-based mapping, evaluations are made more efficient by updating directly some or all of the SQL constructs that already exist.

In one approach, designated the statement "rewrite" approach, the SQL constructs are updated without first manifesting the old instance in memory. In another approach, designated herein the "dirty-bit optimization" approach, the old instance is manifest in memory, but only the SQL constructs that represent changed XML constructs are updated.

FIG. 7B is a flow diagram that illustrates embodiments of several steps depicted in the method of FIG. 7A for updating an XML construct that is already stored in an SQL construct by the DBMS. Steps 710a, 720a, 740a are embodiments of step 710, 720, 740, respectively, from FIG. 7A.

Rewrite of SQL Statement with Operator

In this embodiment, an XML modification function with an XML construct argument is rewritten under some circumstances as one or more SQL operations on SQL constructs. For purposes of illustration, it is assumed that an SQL statement (S1) listed below is received by the database server 130. The SQL statement S1 includes the DML operation UPDATE to change the data stored in the database, so S1 is considered for rewriting during compilation to eliminate the included UPDATEXML function.

UPDATE po
SET value (po)=

UPDATEXML(value(po), '/purchaseOrder/@orderDate','Jan. 2, 2002') WHERE EXTRACTVALUE(value(po),'purchaseOrder/shipTo/name')='Alice Smith' (S1)

The SQL/XML standard function EXTRACTVALUE, as is well known, provides text contained at the XML construct identified by the XPath expression. Because the construct to be updated, attribute orderDate, is already stored in column orderdate in table po 144, it would be desirable to rewrite this statement to update that column directly, without first generating an in-memory representation of a purchaseOrder element and traversing that element to the orderDate node. A desired example rewrite is given as SQL statement (S2):

UPDATE po
SET po.XMLData."orderdate"=

TO_DATE('Jan. 2, 2002', 'SYYYY-MM-DD') WHERE po.XMLData."name"='Alice Smith' (S2)

In this example, the XMLData is a special column name for a column of, XML type for which metadata appears in the XML schema-based mapping in the Oracle 9i Database. Note that SQL statement S2 is more efficient than statement S1, because it does not require the generation or traversal of an in-memory representation of an XML instance, nor does it require the generation of new SQL constructs for a new mapping or table or column to store the new updated XML instance.

In step 712, it is determined whether the conditions permit the SQL statement to be rewritten. For example, an SQL statement involving the DELETXML, INSERTXML, INSERTXMLBEFORE, APPENDCHILDXML, or UPDATEXML function is rewritten if the following conditions are satisfied.

1. The, first argument is an XML type that has been stored object-relationally, e.g., the first argument is an XML construct that is already stored with a mapping in an SQL construct. For example, the first argument is an XMLType, such as an XMLType column or a row of an XMLType table, in the Oracle 9i Database using an XML schema mapping.

2. The first argument is the same as the construct being updated in the SET clause (the left hand side, LHS, of the =sign in the SET clause, is the construct being updated). In the above example, this condition is, satisfied because value(po) (a row in the XMLType table po) is the first argument of the UPDATEXML function and is the LHS of the SET clause.

3. For the DELETEXML function, it is possible to determine at compile time, using the mapping 142, a unique column or set of columns, or a set of collection elements, indicated by the second argument (e.g., the XPath expression).

4. For the INSERTXML, INSERTXMLBEFORE, APPENDCHILD functions, it is possible to determine at compile time, using the mapping 142 and the second argument (e.g., the, YPath expression), a unique column that is being updated.

5. For the UPDATEXML function, it is possible to determine at compile time, using the mapping 142, a unique column or a unique collection element, indicated by the second argument (e.g., the XPath expression).

It may not be possible to determine SQL constructs to be modified at compile time. For example, the XPath may include one or more components that are determined dynamically based on contents in one or more SQL constructs or computations performed.

In step 714, a particular set of SQL constructs that are to be modified by the functions is determined. For example, the unique column or collection element to be modified by the UPDATEXML function is determined while step 712 is performed to determine whether the unique column or collection element can be determined.

In step 716, the SQL statement is rewritten without the XML modification operator. In one embodiment of step 716, it is determined whether the construct being modified is a unique column. If so, the LHS of the SET clause is replaced with the unique column. For example, the LHS of S1, above, is replaced by the orderdate column in the LHS of S2. It is then determined whether the operator is the DELETXML function. If so, the right hand side (RHS, after the "=" sign) of the SET clause is replaced by "null." If the operator is not the DELETEXML function, then the RHS is replaced with the last argument, the expression for the contents of the XML construct, with appropriate casting. For example, the RHS with the UPDATEXML function of S1, above, is replaced by 'Jan. 2, 2002' in the RHS of S2 along with the TO_DATE function call to convert to date data required by the orderdate column.

In this embodiment of step 716, it is determined whether the construct being modified is a collection-element. If so, then it is determined which operator operates on the construct being modified. If the operator is the DELETEXML operator, then the SQL-statement is changed to an SQL DELETE statement on the table where the collection is stored, e.g., store table 148. An SQL WHERE clause is added to identify the rows of the store table being modified. If the operator is the UPDATEXML function, then the table being modified is changed to the store table and a WHERE clause is added to identify the row of the store table where the change is to occur. This row occupies the LHS of the SET clause. The RHS of the SET clause is replaced with the last argument with appropriate casting.

Control then passes to the evaluation step, where the SQL operations on the SQL constructs are evaluated. For example, in the rewritten UPDATEXML function, the rewritten SQL statement S2 is evaluated in step 750, during step 740a for changing SQL constructs that represent changed XML constructs. Step 720, such as step 720a, is skipped. An in-memory representation is not generated or updated.

Dirty-bit Optimization

In this embodiment, an XML modification function with an XML instance component argument that cannot be rewritten is evaluated using an in-memory representation and, under some circumstances, certain SQL constructs are updated rather than updating all SQL constructs for the new, modified instance. For purposes of illustration, it is assumed that an SQL statement (S3) listed below is received by the database server 130.

```
UPDATE po
SET value (po) =
    DELETEXML (
        UPDATEXML(value(po),
            '/purchaseOrder/itemList/item[2]/shipDate',
            '2002-01-02'),
        "/purchaseOrder/shipTo)                           (S3)
```

The statement S3 is directed to updating each purchaseOrder element in the po table so that the ship date (element name "shipDate") of the second line item (element name "lineItem") in the itemList has the specified value, and to then deleting the shipTo element in the updated purchaseOrder element. It is assumed, for purposes of illustration, that the mapping 142 includes metadata that indicates that the itemList includes a collection of child elements called "item," and that each item element includes an "itemName" child element and a "shipDate" child element and that the collection is stored in a store table 148 called "po_items." Therefore, the po_items table 148 includes a setid column for a set identification that identifies rows of the collection table that belong to a particular set associated with a particular purchaseOrder element, an index column for indicating a particular position in the list of items, an itemname column for an itemName element value and a shipdate column for a shipDate element value. Statement S3 is equivalent to the following set of statements, called S4 and S5, if only the affected columns were updated with SQL operators.

UPDATE po SET value(p).shipTo=null where rowid=:1;    (S4)

UPDATE po_items i SET value(i).shipDate='Jan. 2, 2002'

WHERE i.index=2 and setid :1;    (S5)

It would be desirable for the po table 144 to be updated to null the value of the shipTo column and that the store table 148 be updated to change the shipdate column of the second item of the setid associated with each row of the po table, as described in statements S4 and S5. Without dirty-bit optimization, however, statement S3 would be evaluated by updating every column of every row in both the op table and the collection table.

In the illustrated embodiment, it is possible to employ dirty-bit optimization under the following conditions, which are similar to some of the conditions for compile time rewrites.

1. The first argument is an XML type that has been stored object-relationally, e.g., the first argument is an XML construct that is already stored with a mapping in an SQL construct. For example, each purchaseOrder element is stored object relationally in a row of the XML type table po.

2. The first argument is the same as the construct being updated in the SET clause In the above example, this condition is satisfied because value(po) (a row in the XMLType table po) is the first argument of the UPDATEXML function and the updated value(po) is the first argument in the DELETEXML function and value(po) is in the LHS of the SET clause of statement S3.

In step 722, the in-memory representation is generated for the next purchaseOrder element in the po table 144. Because the purchaseOrder element is stored in an SQL construct of XML Type (a row in an XMLType table) it is schema-based and a bit vector is included in the in-memory representation.

In step 724, the nodes affected by the evaluation of the operation are changed, and corresponding bits in the bit vector are marked as "dirty" because they have been modified in the in-memory representation, but not yet stored in any SQL construct. Control passes through step 730 to step 742 of step 740a because the purchaseOrder element is stored object relationally, as indicated above.

In step 742, the nodes that are affected by the update are determined. In the illustrated embodiment, step 742 is performed based on the dirty bits stored in the bit vector 288 of the node data structure 282 of the parent node of the XML construct that has changed.

In step 744, the nodes affected are mapped to SQL constructs that are affected, often a subset of the SQL constructs that store data for the whole XML instance. In one embodiment, if a dirty bit is set for an abstract data type (ADT) such as an object, or for a collection that is not stored in a store table, then contents are generated only for that ADT or collection. This ADT or collection may be deep inside the SQL construct for the instance so that not all contents of the instance are generated. In the illustrated example, the dirty bit is set for the shiPTo element, so only the (null) contents for the shipTo element are generated, not all the contents for the purchaseOrder element.

If a dirty bit is set for a collection, stored in a separate store table, the setid of the collection is identified from the parent element (e.g., the itemList element on the purchaseOrder row of the po table) and the store table is identified from the metadata in the mapping 142. When the whole collection is updated, then contents are generated for all rows in the store table that match the setid. When a particular element of the collection is updated, then contents are generated for only one row in the store table.

In step 746, the contents generated for the node indicated by the dirty bit are inserted into the SQL construct associated with that node. For example, the null contents for the shipTo element are inserted into the shipto ADT column that includes columns country, name, street. The date Jan. 2, 2002 is inserted into shipdate column of the po_items table on a row with a setid that matches the setid in the itemList column of the po table, and with a value in the index column of 2.

Step 722 is analogous to steps 308, 408, 508, 608 for the other modification functions. Step 724 is analogous to steps 310, 410, 510, 610 for the other modification functions. Steps analogous to steps 742, 744, 746, 750 in step 740a are performed in steps 322, 422, 522, 622 for the other modification functions.

Using dirty-bit optimization, less than all the SQL constructs that represent an XML document are updated, increasing efficiency in evaluating an SQL statement that modifies the contents of an XML instance managed by a SQL DBMS.

Hardware Overview

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer, readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818a. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for changing data for an eXtensible Markup Language (XML) construct in a Structured Query Language (SQL) compliant database management system (DBMS) that allows instances of XML type to represent XML constructs, comprising the steps of:

receiving a SQL statement that includes an operator that operates on a component that is less than all of an instance of XML type; and during execution of the SQL statement, evaluating the operator by modifying content for the component without modifying all of the instance of XML type.

2. A method for changing data for an eXtensible Markup Language (XML) construct in a Structured Query Language (SQL) compliant database management system (DBMS) that allows instances of XML type to represent XML constructs, comprising the steps of:

receiving a SQL statement that includes a delete operator that operates on a first component of an instance of XML type; and during execution of the SQL statement, evaluating the delete operator by deleting the first component from the instance of XML type.

3. The method as recited in claim 2, further comprising, during execution of the SQL statement, performing the step of changing a particular SQL construct that stores data representing the component to exclude data representing the component.

4. The method as recited in claim 2, said step of evaluating the delete operator further comprising the steps of:

representing the first instance of XML type in memory as a plurality of data structures, wherein each data structure represents a particular node in an XML tree hierarchy that corresponds to the first instance of XML type and each data structure includes a set of pointers that point to any child nodes of the particular node;

traversing the XML tree hierarchy to reach a first data structure representing a first node that corresponds to the component; and deleting the first data structure.

5. The method as recited in claim 4, wherein:

said step of representing the first instance of XML type in memory further comprises including in each data structure, a bit vector equal in length to a number of the child nodes of the particular node represented by the data structure; and said step of evaluating the delete operator further comprising the step of changing a bit to indicate a modified child at a bit corresponding to the first node in a first bit vector in a second data structure that represents a parent node of the first node.

6. A method for changing data for an eXtensible Markup Language (XML) construct in a Structured Query Language (SQL) compliant database management system (DBMS) that allows instances of XML type to represent XML constructs, comprising the steps of:

receiving an SQL statement that includes an insert operator that operates on a first component in an instance of XML type, wherein the first component represents a first XML construct,
data that indicates a name an element for the first XML construct, and
an expression for a particular value for XML content; and during execution of the SQL statement, evaluating the insert operator by generating, based on the expression for the particular value, a second component that represents a second XML construct that is a child XML element of the first XML construct and has an XML element name based on the data that indicates the name.

7. The method as recited in claim 6, said step of evaluating the insert operator further comprising the step of generating a particular SQL construct that stores data that represents the second XML construct.

8. The method as recited in claim 6, said step of evaluating the insert operator further comprising the steps of:

determining whether a third XML element exists in the instance of XML type, which third XML element is a child XML element of the first XML construct and has the same XML element name as the second XML element; and if the third XML element exists, then said step of generating the second component representing the second XML construct further comprises inserting the second XML construct after the third XML element in XML document order.

9. The method as recited in claim 6, said step of evaluating the insert operator further comprising the steps of:

representing the instance of XML type in memory as a plurality of data structures, wherein each data structure represents a particular node in an XML tree hierarchy that corresponds to the instance of XML type and each data structure includes a set of pointers that point to any child nodes of the particular node;

traversing the XML tree hierarchy to reach a first data structure representing a first node that corresponds to the first XML construct; and generating a second data structure that corresponds to the second XML construct.

10. The method as recited in claim 9, wherein:

said step of representing the instance of XML type in memory further comprises including in each data structure, a bit vector equal in length to a number of the child nodes of the particular node represented by the data structure; and said step of evaluating the insert operator further comprising the step of adding a bit that indicates a modified child to a first bit vector in the first data structure.

11. A method for changing data for an eXtensible Markup Language (XML) construct in a Structured Query Language (SQL) compliant database management system (DBMS) that allows instances of XML type to represent XML constructs, comprising the steps of:

receiving an SQL statement that includes an insert-before operator that operates on a first component in an instance of XML type, wherein the first component represents a first XML construct, and
an expression for a particular value for XML content; and during execution of the SQL statement, evaluating the insert-before operator by generating, based on the expression for the particular value, a second component representing a second XML construct inserted before the first XML construct in the instance of XML type in XML document order.

12. The method as recited in claim 11, said step of evaluating the insert-before operator comprising the steps of generating a particular SQL construct that stores data that represents the second XML construct.

13. The method as recited in claim 11, said step of evaluating the insert-before operator further comprising the steps of:

representing the instance of XML type in memory as a plurality of data structures, wherein each data structure represents a particular node in an XML tree hierarchy that corresponds to the instance of XML type and each data structure includes a set of pointers that point to any child nodes of the particular node;

traversing the XML tree hierarchy to reach a first data structure representing a first node that corresponds to the first XML construct; and generating a second data structure that corresponds to the second XML construct.

14. The method as recited in claim 13, wherein:
said step of representing the XML construct in memory further comprises including in each data structure, a bit vector equal in length to a number of the child nodes of the particular node represented by the data structure; and said step of evaluating the insert-before operator further comprising the step of adding a bit that indicates a modified child to a first bit vector in a third data structure that represents a parent node of the first node.

15. The method as recited in claim 11, wherein:
said step of evaluating the insert-before operator further comprises the step of determining whether the first XML construct is an XML element; and said step of generating the second XML construct further comprises generating the second XML construct as a child XML element of a parent element of the first XML construct if it is determined that the first XML construct is an XML element.

16. The method as recited in claim 15, said step of generating the second XML construct further comprising the step of generating the second XML construct as a XML attribute of the parent element of the first XML construct, if it is determined that the first XML construct is an XML attribute.

17. A method for changing data for an eXtensible Markup Language (XML) construct in a Structured Query Language (SQL) compliant database management system (DBMS) that allows instances of XML type to represent XML constructs, comprising the steps of:

receiving an SQL statement that includes an append-child operator that operates on a first component in an instance of XML type, wherein the first component represents a first XML construct, and
an expression for a particular value for XML content; and during execution of the SQL statement, evaluating the append-child operator by generating, based on the expression for the particular value, a second component that represents a second XML construct that is a child of the first XML construct in the instance of XML type.

18. The method as recited in claim 17, said step of evaluating the append-child operator further comprising the steps of generating a particular SQL construct that stores data that represents the second XML construct.

19. The method as recited in claim 17, said step of evaluating the append-child operator further comprising the steps of:

representing the instance of XML type in memory as a plurality of data structures, wherein each data structure represents a particular node in an XML tree hierarchy that corresponds to the instance of XML type and each data structure includes a set of pointers that point to any child nodes of the particular node;

traversing the XML tree hierarchy to reach a first data structure representing a first node that corresponds to the first XML construct;

generating a second data structure that corresponds to the second XML construct.

20. The method as recited in claim 19, wherein:
said step of representing the instance of XML type in memory further comprises including in each data structure, a bit vector equal in length to a number of the child nodes of the particular node represented by the data structure; and said step of evaluating the append-child operator further comprising the step of adding a bit that indicates a modified child to a first bit vector in the first data structure.

21. The method as recited in claim 17, wherein:
said step of evaluating the append-child operator further comprises the step of determining whether the first XML construct is an XML element; and said step of generating the second component is performed only if it is determined that the first XML construct is an XML element.

22. A method for changing data for an eXtensible Markup Language (XML) construct in a Structured Query Language (SQL) compliant database management system (DBMS) that allows instances of XML type to represent XML constructs, comprising the steps of:

receiving a SQL statement that includes an update operator that operates on a first component in an instance of XML type, wherein the first component represents a first XML construct, and
an expression for a particular value for XML content; and during execution of the SQL statement, evaluating the update operator by generating, based on the expression for the particular value, a second component that represents a second XML construct that replaces the first XML construct in the instance of XML type.

23. The method as recited in claim 22, said step of evaluating the update operator further comprising the steps of generating a first SQL construct that stores data that represents the instance XML of XML type.

24. The method as recited in claim 22, wherein:
said step of evaluating the update operator further comprising the steps of:
modifying an in-memory representation of the instance of XML type;
determining whether a portion of the in-memory representation that is modified during said step of modifying the in-memory representation is less than all of the in-memory portion;
if it is determined that the portion is less than all of the in-memory representation, then determining whether an SQL construct stores data for the portion; and
modifying the SQL construct.

25. The method as recited in claim 22, wherein:
the method further comprises the step of compiling the SQL statement, including:
determining a particular set of one or more SQL constructs that are affected by the update operator operating on the first component of the instance of XML type; and
rewriting the SQL statement on the first component as a set of one or more SQL operations on the particular set of one or more SQL constructs; and
said step of evaluating the update operator comprises evaluating the set of one or more SQL operations on the particular set of one or more SQL constructs.

26. The method as recited in claim 25, wherein the particular set of one or more SQL constructs includes fewer SQL constructs than a complete set of SQL constructs that store data for all descendent XML constructs of the instance of XML type.

27. A method for executing database update commands on extensible markup language (XML constructs in a Structured Query Language (SQL) compliant database management system (DBMS) that allows instances of XML type to represent XML constructs, comprising the steps of:

receiving a database modification statement to modify a first component in an instance of XML type, wherein the first component represents a first XML construct; and during execution of the database modification statement, evaluating the database modification statement, including determining, of the instance of XML type, a first portion that is affected by executing the database modification statement, wherein the first portion is less than all of the instance of XML type; and mapping the first portion to a first set of at least one SQL construct; and updating the first set of at least one SQL construct without updating a second set of at least one SQL construct that represents a second portion of the instance of XML type, wherein the second portion is not affected by executing the database modification statement.

28. The method of claim 27, wherein:

the method further includes the step of representing the instance of XML type in memory as a plurality of data structures;

each data structure represents a particular node in an XML tree hierarchy that corresponds to the instance of XML type; and said step of determining the first portion comprises determining which data structure is associated with contents which have changed during said step of evaluating the database modification statement.

29. The method of claim 28, wherein:

each data structure includes a set of zero or more bits that indicates whether the contents associated with the data structure have changed during said step of evaluating the database modification statement; and said step of determining the particular portion further comprises determining for each data structure of the plurality of data structures whether the set of zero or more bits indicates that contents associated with the data structure have changed.

30. The method of claim 29, wherein the set of zero or more bits at each data structure includes a bit for each child node of a node represented by the data structure.

31. A method for executing database update commands on extensible markup language (XML) constructs in a Structured Query Language (SQL) compliant database management system (DBMS) that allows instances of XML type to represent XML constructs, comprising the steps of:

receiving a database modification statement to modify a first component in an instance of XML type, wherein the first component represents a first XML construct;

compiling the database modification statement, including:

determining a particular set of one or more SQL constructs that are affected by the database modification statement; and rewriting the database modification statement as a set of one or more SQL operations on the particular set of one or more SQL constructs; and evaluating the database modification statement by evaluating the set of one or more SQL operations on the particular set of one or more SQL constructs.

32. The method as recited in claim 31, wherein the particular set of one or more SQL constructs includes fewer SQL constructs than a complete set of SQL constructs that represent all descendent XML constructs of the instance of XML type.

33. A computer-readable medium carrying one or more sequences of instructions for changing data for an eXtensible Markup Language (XML) construct in a Structured Query Language (SQL) compliant database management sys tem (DBMS) that uses instances of XML type to represent XML constructs, wherein execution of the one or more sequences of instructions by one or more processors causes the one or more processors to perform the steps of:

receiving a SQL statement that includes an operator that operates on a component that is less than all of an instance of XML type; and during execution of the SQL statement, evaluating the operator by modifying content for the component without modifying all of the instance of XML type.

34. A computer-readable medium carrying one or more sequences of instructions for changing data for an eXtensible Markup Language (XML) construct in a Structured Query Language (SQL) compliant database management system (DBMS) that allows instances of XML type to represent XML constructs, wherein execution of the one or more sequences of instructions by one or more processors causes the one or more processors to perform the steps of:

receiving a SQL statement that includes a delete operator that operates on a first component of an instance of XML type; and during execution of the SQL statement, evaluating the delete operator by deleting the first component from the instance of XML type.

35. A computer-readable medium carrying one or more sequences of instructions for changing data for an eXtensible Markup Language (XML) construct in a Structured Query Language (SQL) compliant database management system (DBMS) that allows instances of XML type to represent XML constructs, wherein execution of the one or more sequences of instructions by one or more processors causes the one or more processors to perform the steps of:

receiving an SQL statement that includes an insert operator that operates on a first component in an instance of XML type, wherein the first component represents a first XML construct, data that indicates a name of an element for the first XML construct, and an expression for a particular value for XML content; and during execution of the SQL statement, evaluating the insert operator by generating, based on the expression for the particular value, a second component that represents a second XML construct that is a child XML element of the first XML construct and has an XML element name based on the data that indicates the name.

36. A computer-readable medium carrying one or more sequences of instructions for changing data for an eXtensible Markup Language (XML) construct in a Structured Query Language (SQL) compliant database management system (DBMS) that allows instances of XML type to represent XML constructs, wherein execution of the one or more sequences of instructions by one or more processors causes the one or more processors to perform the steps of:

receiving an SQL statement that includes an insert-before operator that operates on a first component in an instance of XML type, wherein the first component represents a first XML construct, and an expression for a particular value for XML content; and during execution of the SQL statement, evaluating the insert-before operator by generating, based on the expression for the particular value, a second component that represents a second XML construct inserted before the first XML construct in thee instance of XML type in XML document order.

37. A computer-readable medium carrying one or more sequences of instructions for changing data for an eXtensible Markup Language (XML) construct in a Structured Query Language (SQL) compliant database management system (DBMS) that allows instances of XML type to represent XML constructs, wherein execution of the one or more sequences of instructions by one or more processors causes the one or more processors to perform the steps of:

receiving an SQL statement that includes an append-child operator that operates on a first components in an instance of XML type, wherein the first component represents a first XML construct, and an expression for a particular vale for XML content; and during execution of the SQL statement, evaluating the append-child operator by generating, based on the expression for the particular value, a second component that represents a second XML construct that is a child of the first XML construct in the instance of XML type.

38. A computer-readable medium carrying one or more sequences of instructions for changing data for an eXtensible Markup-Language (XML) construct in a Structured Query Language (SQL) compliant database management system (DBMS) that allows instances of XML type to represent XML constructs, wherein execution of the one or more sequences of instructions by one or more processors causes the one or more processors to perform the steps of:

receiving a SQL statement that includes an update operator that operates on a first component in an instance of XML type, wherein the first component represents a first XML construct, and an expression for a particular value for XML content; and during execution of the SQL statement, evaluating the update operator by generating, based on the expression for the particular value, a second component that represents a second XML construct that replaces the first XML construct in the instance of XML type.

39. A computer-readable medium carrying one or more sequences of instructions for executing database update commands on extensible markup language (XML) constructs in a Structured Query Language (SQL) compliant database management system (DBMS) that allows instances of XML type to represent XML constructs, wherein execution of the one or more sequences of instructions by one or more processors causes the one or more processors to perform the steps of:

receiving a database modification statement to modify a first component in an instance of XML type, wherein the first component represents a first XML construct; and during execution of the database modification statement, evaluating the database modification statement, including determining, of the instance of XML type, a first portion that is affected by executing the database modification statement, wherein the first portion is less than all of the instance of XML type; and mapping the first portion to a first set of at least one SQL construct; and updating the first set of at least one SQL construct without updating a second set of at least one SQL construct that represents a second portion of the instance of XML type, wherein the second portion is not affected by executing the database modification statement.

40. A computer-readable medium carrying one or more sequences of instructions for executing database update commands on extensible markup language (XML) constructs in a Structured Query Language (SQL) compliant database management system (DBMS) that allows instances of XML type to represent XML constructs, wherein execution of the one or more sequences of instructions by one or more processors causes the one or more processors to perform the steps of:

receiving a database modification statement to modify a first component in an instance of XML type, wherein the first component represents a first XML construct;

compiling the database modification statement, including:
determining a particular set of one or more SQL constructs that are affected by the database modification statement; and rewriting the database modification statement as a set of one or more SQL operations on the particular set of one or more SQL constructs; and evaluating the database modification statement by evaluating the set of one or more SQL operations on the particular set of one or more SQL constructs.

* * * * *

UNITED STATES PATENT AND TRADEMARK OFFICE
CERTIFICATE OF CORRECTION

PATENT NO.    : 6,836,778 B2
DATED         : May 1, 2003
INVENTOR(S)   : Anand Manikutty It is certified that error appears in the above-identified patent and that said Letters Patent is hereby corrected as shown below:

Title page,
Item [56], References Cited, OTHER PUBLICATIONS, please add:
-- Josephine Cheng, et al., "IBM DB2 XML Extender, An end-to-end solution for storing and retrieving XML documents," IEEE, ICDE '00 Conference, San Diego, February 2000, 128 pages.

Jim Melton, "ISO-ANSI Working Draft, XML-Related Specifications (SQL/XML)," WG3: DRS-020, H2-2002-365, August 2002, 154 pages.

Oracle Corporation, "Oracle9*i* XML Database Developer's Guide – Oracle XML DB," Release 2 (9.2), March 2002, Part No. A96620-1, pp. 4-31– 4-35, 5-21– 5-24 and 5-70 – 5-71.

W3C, "XML Schema Part 1: Structures, " W3C Recommendation, 2 May 2001, http://www.w3.org/TR/2001REC-xmlschema-1-20010502/, pp. 1-203 (text provided on CD-ROM).

W3C, "XML Schema Part 2: Datatypes," W3C Recommendation, 2 May 2001, http://www.w3.org/TR/2001/REC-xmlschema-2-20010502/, pp. 1-146 (text provided on CD-ROM --

Column 36,
Line 8, delete "sys tem" and insert -- system --.

UNITED STATES PATENT AND TRADEMARK OFFICE
CERTIFICATE OF CORRECTION

PATENT NO. : 6,836,778 B2
DATED : May 1, 2003
INVENTOR(S) : Anand Manikutty

It is certified that error appears in the above-identified patent and that said Letters Patent is hereby corrected as shown below:

<u>Column 37,</u>
Line 5, delete "thee" and insert -- the --.
Line 16, delete "components" and insert -- component --.

Signed and Sealed this

Eighth Day of March, 2005

JON W. DUDAS
*Director of the United States Patent and Trademark Office*